(12) United States Patent
Nozawa

(10) Patent No.: US 12,152,938 B2
(45) Date of Patent: Nov. 26, 2024

(54) IMAGING SYSTEM AND IMAGING METHOD

(71) Applicant: Panasonic Intellectual Property Management Co., Ltd., Osaka (JP)

(72) Inventor: Katsuya Nozawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 237 days.

(21) Appl. No.: 17/938,515

(22) Filed: Oct. 6, 2022

(65) Prior Publication Data

US 2023/0025030 A1    Jan. 26, 2023

Related U.S. Application Data

(63) Continuation of application No. PCT/JP2021/010993, filed on Mar. 18, 2021.

(30) Foreign Application Priority Data

Apr. 27, 2020   (JP) .................................. 2020-078232

(51) Int. Cl.
*G01J 3/433*    (2006.01)
*G01J 3/02*    (2006.01)
*G01J 3/28*    (2006.01)

(52) U.S. Cl.
CPC ............. *G01J 3/4338* (2013.01); *G01J 3/021* (2013.01); *G01J 3/2823* (2013.01)

(58) Field of Classification Search
None
See application file for complete search history.

(56) References Cited

U.S. PATENT DOCUMENTS

| | | | | |
|---|---|---|---|---|
| 2006/0192938 A1* | 8/2006 | Kawahito | ............. | G01S 7/4863 356/5.03 |
| 2011/0069309 A1* | 3/2011 | Newbury | ................ | G01J 3/453 356/326 |

(Continued)

FOREIGN PATENT DOCUMENTS

| | | |
|---|---|---|
| JP | 2004-032682 | 1/2004 |
| JP | 2004-294420 | 10/2004 |

(Continued)

OTHER PUBLICATIONS

International Search Report of PCT application No. PCT/JP2021/010993 dated Jun. 8, 2021.

*Primary Examiner* — Dominic J Bologna
*Assistant Examiner* — Chad Andrew Reverman
(74) *Attorney, Agent, or Firm* — Rimon P.C.

(57) ABSTRACT

An imaging system includes: a first light source that emits first light having a spectrum including discrete first frequency components arranged at first frequency intervals; a second light source that emits second light having a spectrum including discrete second frequency components arranged at second frequency intervals, the second frequency intervals being different from the first frequency intervals; a mixing optical system that mixes the first light and the second light to generate third light including at least one optical beat the intensity of which changes at a beat frequency expressed by the difference between at least one of the discrete first frequency components and at least one of the discrete second frequency components; an imaging element having a variable sensitivity in an exposure period; and a control circuit that changes the sensitivity of the imaging element at the beat frequency of the at least one optical beat.

18 Claims, 13 Drawing Sheets

(56) References Cited

U.S. PATENT DOCUMENTS

2017/0332025 A1* 11/2017 Nozawa ................. H04N 25/70
2019/0252455 A1*  8/2019 Pattantyus-Abraham ...................
                                                 H01L 27/14612

FOREIGN PATENT DOCUMENTS

JP       2017-208812       11/2017
WO       2003/085413       10/2003
WO    WO-2018080946 A1 *    5/2018   ....... H01L 27/14612

* cited by examiner

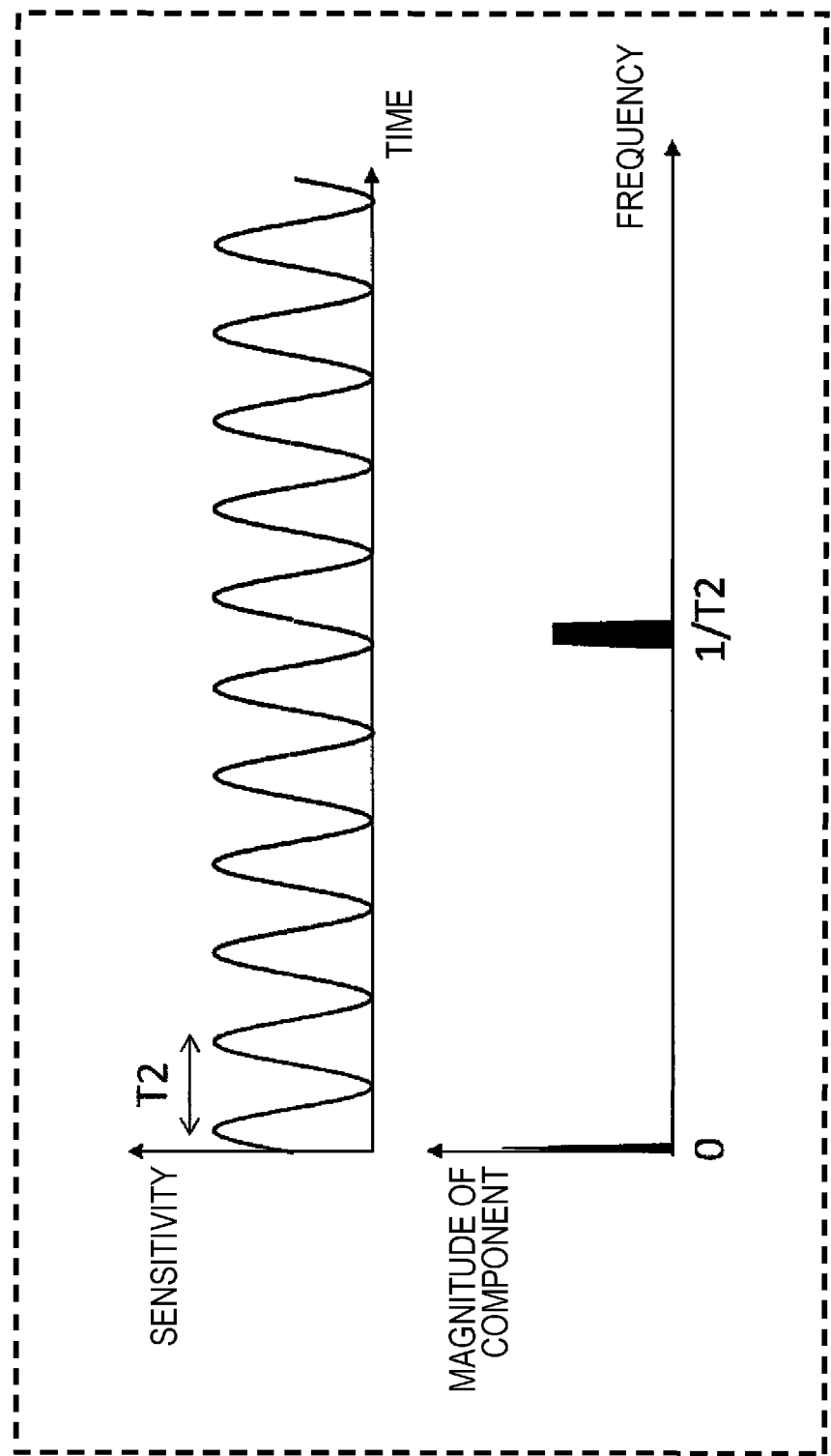

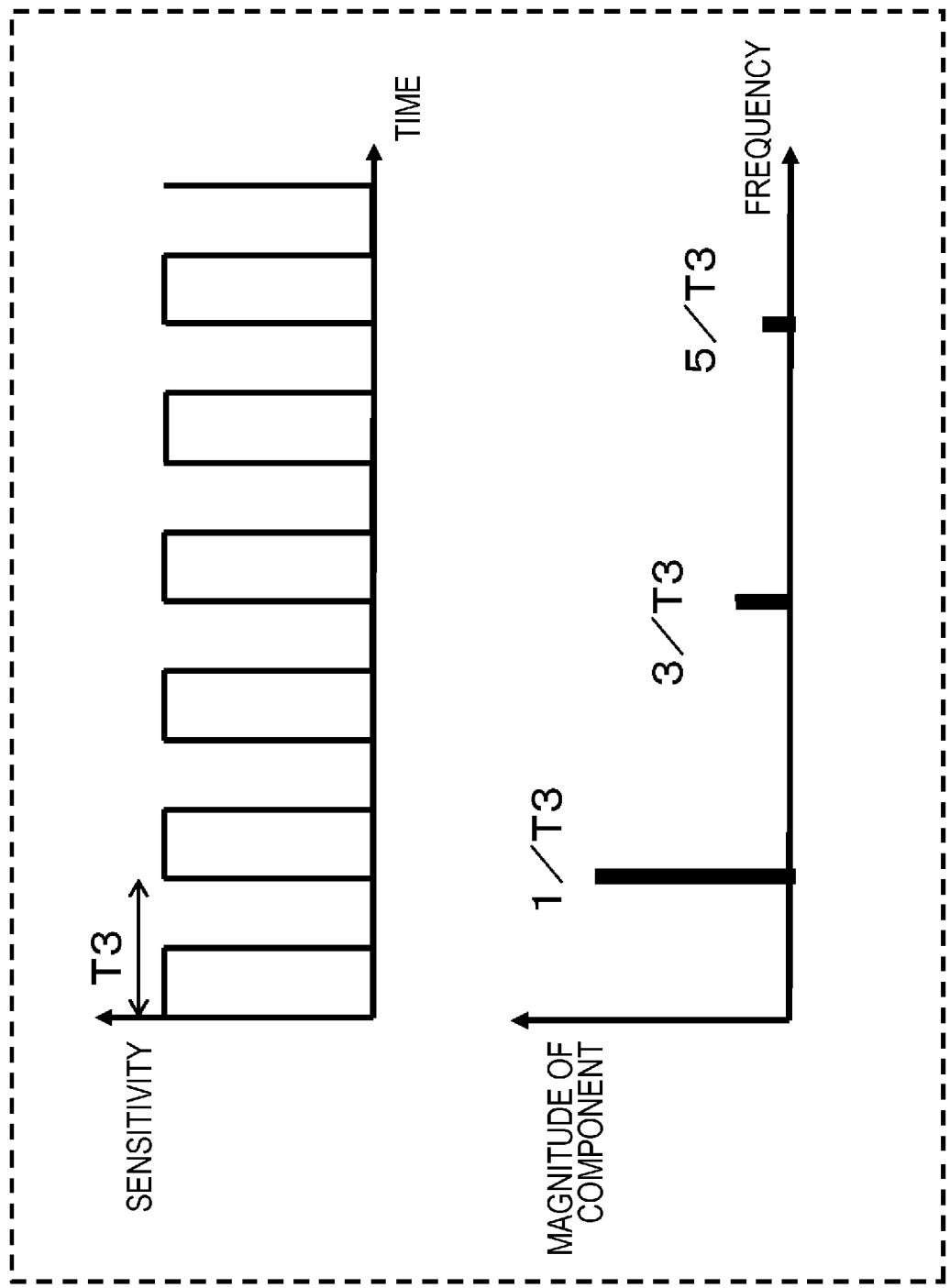

IMAGING SYSTEM AND IMAGING METHOD

BACKGROUND

1. Technical Field

The present disclosure relates to an imaging system and an imaging method.

2. Description of the Related Art

The spectral reflectance and the spectral transmittance of objects are dependent on information on molecules composing the object and the thickness. Hence, it is useful to measure the spectral reflectance and the spectral transmittance to obtain information on objects.

Examples of methods of measuring the spectral reflectance and the spectral transmittance with high accuracy include a method using a Michelson interferometer. A Michelson interferometer is a device with which white light including continuous wavelength components coming out of a light source is divided into two optical paths by a semi-transparent mirror, and the light beams on the two optical paths are reflected on different mirrors and then superimposed. By moving one of the mirrors, the difference between the two optical path lengths changes with time. In this operation, due to the interference effect, the intensity of the light varies between in a strong state and in a weak state, and the two states alternate every time the difference between the optical path lengths becomes an integral multiple of the wavelength. Since the distance that is an integral multiple is proportional to the wavelength, the difference between the optical path lengths causing a strong state and a weak state is different depending on the wavelength. Hence, the period of the intensity change of light between a strong state and a weak state is different for each wavelength.

By using light generated by a Michelson interferometer and having intensity changing in different cycles for each wavelength as illumination light and extracting a specific frequency component out of reflected light and transmitted light, it is possible to know the reflectance and the transmittance of the wavelength corresponding to the frequency component. A general method of extracting a specific frequency component is a method involving measuring the time variation of the intensity of light with a photodiode and performing calculation by Fourier conversion.

The inventor of the present disclosure has proposed a method of extracting a specific frequency component of light from the subject by modulating the sensitivity of the image sensor for capturing an image of the subject in Japanese Unexamined Patent Application Publication No. 2017-208812.

SUMMARY

In one general aspect, the techniques disclosed here feature an imaging system includes: a first light source that emits first light having a spectrum including discrete first frequency components arranged at first frequency intervals; a second light source that emits second light having a spectrum including discrete second frequency components arranged at second frequency intervals, the second frequency intervals being different from the first frequency intervals; a mixing optical system that mixes the first light and the second light to generate third light including at least one optical beat, an intensity of the at least one optical beat changing at a beat frequency expressed by a difference between at least one of the discrete first frequency components and at least one of the discrete second frequency components; an imaging element, a sensitivity of the imaging element being variable in an exposure period; and a control circuit that changes the sensitivity of the imaging element at the beat frequency of the at least one optical beat.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 11B is a diagram showing an example of a function of sensitivity modulation practically having components only at and near the frequency 0 and the frequency 1/T2;

FIG. 13 is a diagram showing a function of sensitivity modulation having square waves and frequency components included in the function of sensitivity modulation.

DETAILED DESCRIPTIONS

Figure 1:
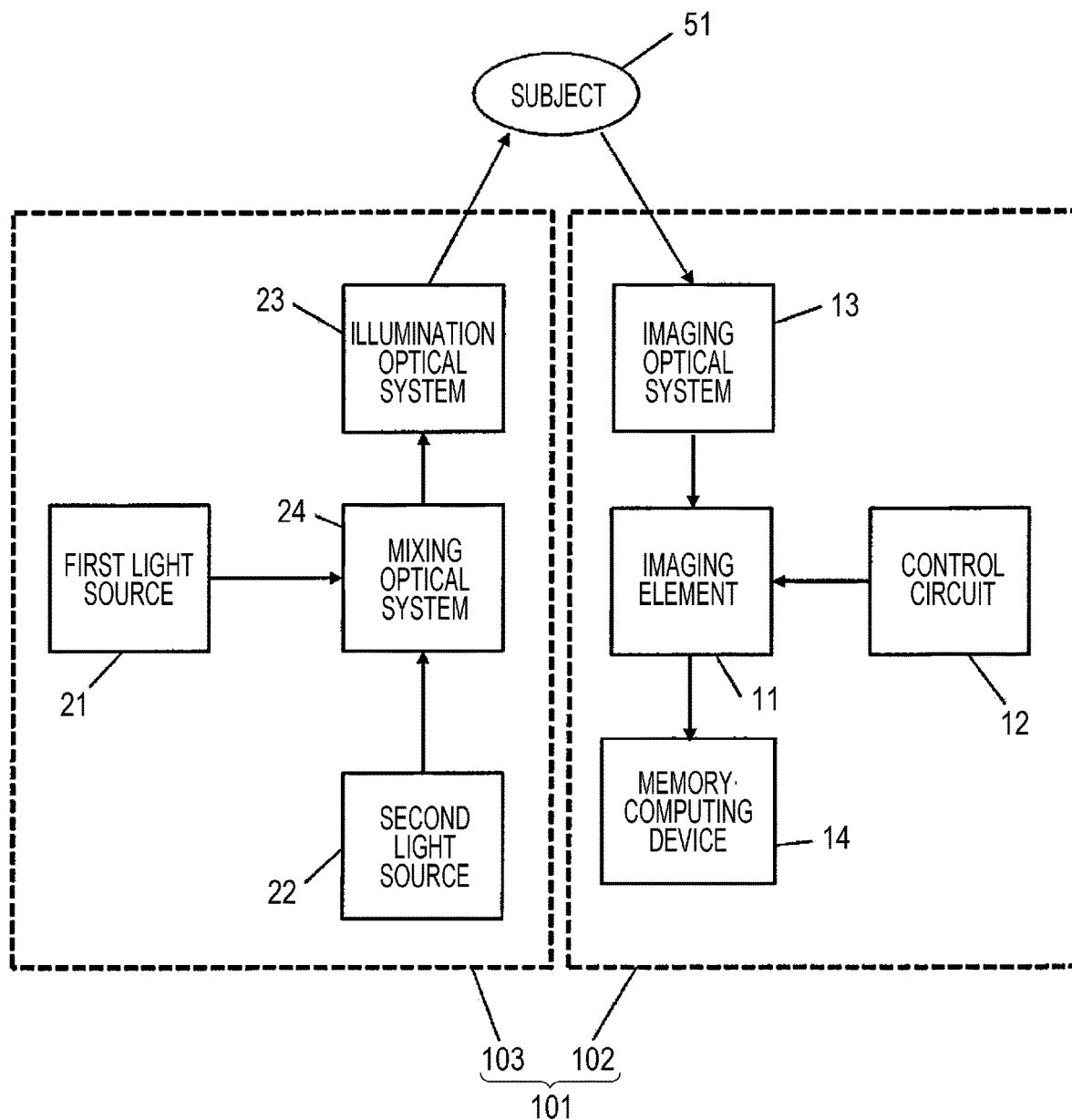
FIG. 1 is a block diagram showing an example of an imaging system according to an embodiment of the present disclosure.

One non-limiting and exemplary embodiment provides an imaging system and an imaging method capable of obtaining information on an object with good reproducibility.

The inventor of the present disclosure studied, in detail, methods of obtaining information such as molecules composing an object and the thickness with high accuracy. In the method in which light having intensity changing in a different cycle for each wavelength, generated by the foregoing Michelson interferometer is used as illumination light, and a specific frequency component is measured out of the reflected light and the transmitted light with a photodiode, the time variation of the intensity has to be measured for all frequency components. This requires a detector that operates at high speed. For this reason, in the case of using an image sensor to obtain an image at a specific wavelength, a plurality of scanning measurements are necessary, and to obtain an image in a limited time, a limitation occurs in that the resolution of the image has to be set low.

With the method disclosed in Japanese Unexamined Patent Application Publication No. 2017-208812, it is possible to obtain an image on which the reflectance and the transmittance are reflected. Also, there is essentially no limitation to the resolution. In the method of performing imaging by modulating the sensitivity, disclosed in Japanese Unexamined Patent Application Publication No. 2017-208812, a component of light having the same frequency as that of the sensitivity modulation of the image sensor is extracted. The relationship between the frequency and wavelength of light is determined by the structure and operation of the interferometer. The modulation cycle of the image sensor is controlled independently of the operation of the interferometer.

For example, assume that a wavelength $\lambda a$ is associated with a frequency $fa$ by an interferometer. In this case, to perform extraction at the wavelength $\lambda a$, the sensitivity of the image sensor has to be modulated accurately at the frequency $fa$. However, it is difficult to fix the modulation cycle of the sensitivity of the image sensor to a single frequency $fa$ accurately. This is because an actual device has errors and temporal fluctuations in the modulation frequency.

Assume that the sensitivity that should originally have been modulated at the frequency $fa$ is modulated at the frequency $fa+\delta f$. In this case, information on the light at a different wavelength corresponding to the frequency $fa+\delta f$, instead of the wavelength $\lambda a$ corresponding to the frequency $fa$, will be extracted. Because the light with different cycles at which the intensity is modulated for each wavelength, generated by the interferometer has a continuous distribution over a wide wavelength range, light at the wavelength corresponding to $fa+\delta f$ always exists for any $\delta f$. Thus, in the case where the modulation frequency has fluctuations during an exposure period, light in the wavelength range corresponding to the fluctuations is extracted. In addition, such errors and fluctuations can vary in every measurement. Thus, in the method in Japanese Unexamined Patent Application Publication No. 2017-208812, it is difficult to avoid a situation in which errors and fluctuations occur in the wavelength range for extraction, and there can be cases in which the measurement has an issue in the reproducibility.

The inventor of the present disclosure, considering the issues described above, has conceived an imaging system and an imaging method capable of obtaining information on molecules composing an object and other information with favorable reproducibility by using an optical frequency comb for the light source and obtaining the spectral reflectance or the spectral transmittance of the object. The following is an overview of the imaging system and the imaging method of the present disclosure.

[Item 1] An imaging system according to Item 1 of the present disclosure includes: a first light source that emits first light having a spectrum including discrete first frequency components arranged at first frequency intervals; a second light source that emits second light having a spectrum including discrete second frequency components arranged at second frequency intervals, the second frequency intervals being different from the first frequency intervals; a mixing optical system that mixes the first light and the second light to generate third light including at least one optical beat, the intensity of the at least one optical beat changing at a beat frequency expressed by the difference between at least one of the discrete first frequency components and at least one of the discrete second frequency components; an imaging element, the sensitivity of the imaging element being variable in an exposure period; and a control circuit that changes the sensitivity of the imaging element at the beat frequency of the at least one optical beat.

[Item 2] In the imaging system according to Item 1, the mixing optical system may be located at a position on an optical path between a subject and the first light source and on an optical path between the subject and the second light source.

[Item 3] In the imaging system according to Item 1, the second light may be not reflected on the subject, and the mixing optical system may mix the second light and first reflected light obtained by the first light being reflected on the subject.

[Item 4] In the imaging system according to Item 1, the second light may be not transmitted through the subject, and the mixing optical system may mix the second light and first transmitted light obtained by the first light being transmitted through the subject.

[Item 5] In the imaging system according to any one of Items 1 to 4, each of the first light source and the second light source may be a mode-locked laser.

[Item 6] In the imaging system according to any one of Items 1 to 5, the sensitivity of the imaging element may be variable by changing the quantum efficiency of the imaging element.

[Item 7] In the imaging system according to any one of Items 1 to 5, the imaging element may include a storage region that stores charges generated in the imaging element, and the sensitivity of the imaging element may be variable by changing the ratio of charges stored in the storage region out of the multiple charges.

[Item 8] In the imaging system according to any one of Items 1 to 7, the at least one optical beat may include a first optical beat and a second optical beat, the frequency of the first optical beat may be different from the frequency of the second optical beat, and the beat frequency of the first optical beat may be different from the beat frequency of the second optical beat.

[Item 9] An imaging method according to Item 9 of the present disclosure includes: mixing first light having a spectrum including discrete first frequency components arranged at first frequency intervals and second light having a spectrum including discrete second frequency components arranged at second frequency intervals, the second frequency intervals being different from the first frequency intervals, to obtain third light including at least one optical beat, the intensity of the at least one optical beat changing at a beat frequency expressed by the difference between at least one of the discrete first frequency components and at least one of the discrete second frequency components; projecting the third light to a subject; making the third light that has been transmitted through the subject or reflected on the subject and that has returned from the subject, incident on an imaging element; and performing exposure while changing a sensitivity of the imaging element at the beat frequency of the at least one optical beat.

[Item 10] An imaging method according to Item 10 of the present disclosure includes: generating first light having a spectrum including discrete first frequency components arranged at first frequency intervals and second light having a spectrum including discrete second frequency components arranged at second frequency intervals, the second frequency intervals being different from the first frequency intervals; projecting the first light to a subject; mixing the first light that has been transmitted through the subject or reflected on the subject and that has returned from the subject and the second light that is not transmitted through or reflected on the subject to obtain third light including at least one optical beat, the intensity of the at least one optical beat changing at a beat frequency expressed by the difference between at least one of the discrete first frequency components and at least one of the discrete second frequency components; making the third light incident on an imaging element; and performing exposure while changing a sensitivity of the imaging element at the beat frequency of the at least one optical beat.

[Item 11] In the imaging method according to Item 9 or 10, the first light and the second light may be generated by a mode-locked laser.

[Item 12] In the imaging method according to any one of Items 9 to 11, the sensitivity of the imaging element may be changed by changing the quantum efficiency of the imaging element.

[Item 13] In the imaging method according to any one of Items 9 to 11, the imaging element may include a storage region that stores charges generated in the imaging element, and the sensitivity of the imaging element may be changed by changing the ratio of charges stored in the storage region out of the multiple charges.

[Item 14] In the imaging method according to any one of Items 9 to 13, the at least one optical beat may include a first optical beat and a second optical beat, the frequency of the first optical beat may be different from the frequency of the second optical beat, and the beat frequency of the first optical beat may be different from the beat frequency of the second optical beat.

Hereinafter, an imaging system and an imaging method of an embodiments of the present disclosure will be described in detail with reference to the drawings.

(Structure of Imaging System 101)

FIG. 1 is a block diagram showing a configuration example of an imaging system of the present disclosure. The imaging system 101 includes an imaging device 102 and an illumination device 103. The imaging device 102 includes at least an imaging element 11 and a control circuit 12, and the illumination device 103 includes at least a first light source 21, a second light source 22, and a mixing optical system 24.

In the imaging system 101 of the present embodiment, the first light source 21 emits first light L1 having a spectrum including a plurality of discrete first frequency components arranged at first frequency intervals. Similarly, the second light source 22 emits second light L2 having a spectrum including a plurality of discrete second frequency components arranged at second frequency intervals, the second frequency interval being different from the first frequency interval. The mixing optical system 24 mixes the first light L1 and the second light L2 and generates third light L3 including at least one of the discrete first frequency components in the spectrum of the first light L1 and at least one of the discrete second frequency components in the spectrum of the second light L2. This third light includes at least one component the intensity of which changes at the frequency determined by the frequency difference between one of the discrete first frequency components and one of the discrete second frequency components, in other words, at least one beat frequency component. In the case where the third light L3 includes a plurality of beat frequency components, the wavelength and the beat frequency are different for each component among the beat frequency components.

This third light L3 is projected to a subject, and light reflected on a subject 51 or light transmitted through the subject 51 is captured by the imaging device 102. The sensitivity of the imaging element 11 can be changed during the exposure period, and the control circuit 12 changes the sensitivity of the imaging element at least one beat frequency included in the reflected or transmitted third light L3. With this configuration, the imaging element 11 captures, out of the plurality of beat frequency components included in the third light L3, only the component the intensity of which changes at the frequency in agreement with the frequency of the sensitivity change. In some cases, the imaging element 11 is capable of mainly capturing, out of the plurality of beat frequency components included in the third light L3, one in agreement with the frequency component having a highest ratio out of the frequency components of the sensitivity change. Because the molecules composing a living body are excited by light at different wavelengths depending on the kind of molecule, it is possible to obtain, by imaging, the distribution of the molecule that is excited at the emission wavelength of the component the intensity of which changes at the frequency in agreement with the frequency of the sensitivity change, for example. Hereinafter, the structure of the imaging system 101 will be specifically described for each constituent.

<First Light Source 21, Second Light Source 22>

Figure 3:
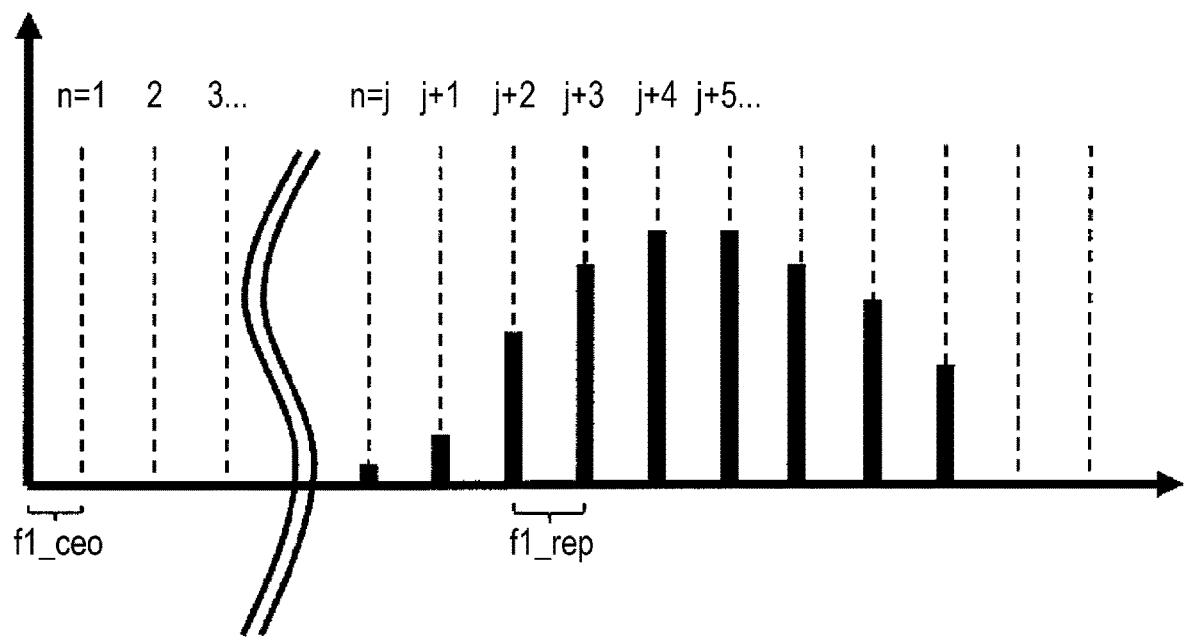
FIG. 3 is a conceptual diagram of the spectrum of first light.
Figure 4:
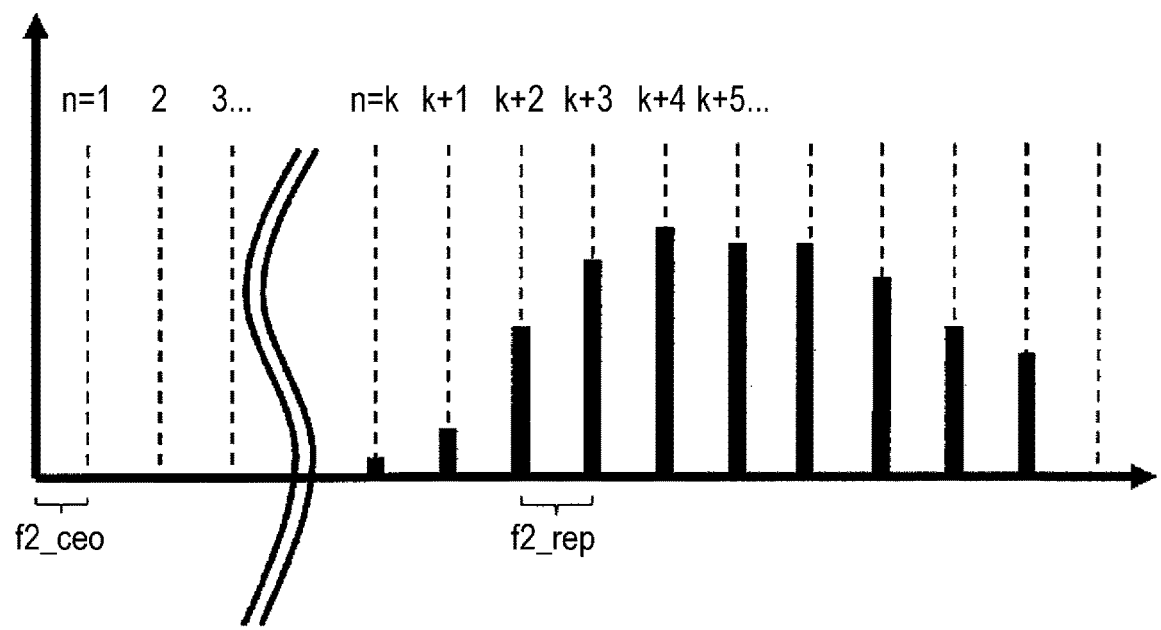
FIG. 4 is a conceptual diagram of the spectrum of second light.

The first light source 21 emits the first light L1 having a spectrum including a plurality of discrete first frequency components arranged at first frequency intervals. Such a light source is called an optical frequency comb. FIG. 3 is a conceptual diagram of the spectrum of the first light L1. As with the first light source 21, the second light source 22 emits the second light L2 having a spectrum including a plurality of discrete second frequency components arranged at second frequency intervals. FIG. 4 is a conceptual diagram of the spectrum of the second light L2. In FIGS. 3 and 4, the horizontal axis represents frequency.

The discrete frequency components $f1(n)$ included in the spectrum of the first light L1 and the discrete frequency components $f2(n)$ included in the spectrum of the second light L2 satisfy (Expression 1) and (Expression 2), respectively.

$$f1(n) = n \times f1\_rep + f1\_ceo \qquad \text{(Expression 1)}$$

$$f2(n) = n \times f2\_rep + f2\_ceo \qquad \text{(Expression 2)}$$

Here, n is an integer larger than or equal to 1. The symbol f1_rep represents the frequency interval between the discrete frequency components. The symbol f1_ceo is a value called the carrier-envelope offset, which corresponds to the remainder obtained when the frequency components of light are divided by the frequency interval. Similarly, f2_rep represents the frequency interval between the discrete frequency components. The symbol f2_ceo is a value called the carrier-envelope offset, which corresponds to the remainder obtained when the frequency components of light are divided by the frequency interval. The value of the frequency interval f2_rep of the second light L2 is different from the value of the frequency interval f1_rep of the first light L1. These values are selected such that one of the values is not an integral multiple of the other.

One of the carrier-envelope offset f1_ceo of the first light L1 and the carrier-envelope offset f2_ceo of the second light L2 may be a value that is not 0. Both of the carrier-envelope offset f1_ceo of the first light L1 and the carrier-envelope offset f2_ceo of the second light L2 may be 0.

Of the frequency components of the first light L1 and the frequency components of the second light L2, the components having practically significant intensity are ones in part of the ranges of n in (Expression 1) and (Expression 2). The frequency and wavelength of light satisfy the following relationship:

(wavelength)=(speed of light)/(frequency of light).

Thus, the frequency ranges in which the first light L1 and the second light L2 have practically significant intensity are determined by the wavelength ranges in which the first light L1 and the second light L2 have practically significant intensity.

The wavelength ranges in which the first light L1 and the second light L2 have practically significant intensity are determined by the method of generating the light and subsequent limiting means such as conversion and filters.

For example, representative examples of the method of generating the first light L1 and the second light include one using a mode-locked (synchronized) laser. A mode-locked laser is a laser in which the phases of the oscillation modes of the resonator are aligned. A mode-locked laser can be formed by using a titanium-doped sapphire laser, a rare earth-doped optical fiber laser, or the like. The oscillation wavelength range of the titanium-doped sapphire laser is approximately from 660 nm to 1100 nm. Of the rare earth-doped optical fiber lasers, the wavelength range of an ytterbium-doped optical fiber laser is approximately from 1025 nm to 1075 nm. The wavelength range of an erbium-doped optical fiber laser is approximately from 1500 nm to 1600 nm. The wavelength range of a thulium-doped optical fiber laser is approximately from 1800 nm to 2050 nm.

Converting these wavelength ranges into frequency ranges, the frequency range of the titanium-doped sapphire laser is approximately from 273 THz to 455 THz, the frequency range of the ytterbium-doped optical fiber laser is approximately from 293 THz to 279 THz, the frequency range of the erbium-doped optical fiber laser is approximately from 200 THz to 188 THz, and the frequency range of the thulium-doped optical fiber laser is approximately from 146 THz to 167 THz.

The wavelength ranges in which the first light L1 and the second light L2 have practically significant intensity may be the entire oscillation wavelength ranges of these lasers but may be, as described later, ranges limited by filters or the like. By limiting the wavelength range, the frequency range can be determined from the relationship between the wavelength and frequency of light.

The first light L1 and the second light L2 can be generated by a method using an electro-optical modulator. This method uses a single frequency laser and an electro-optical modulator. By making the laser light emitted from the single frequency laser incident on the electro-optical modulator and driving the electro-optical modulator at a single frequency, it is possible to generate a plurality of discrete frequency components lined at regular frequency intervals on the upper and lower sides of the frequency of the incident laser light, the regular frequency interval being the drive frequency of the electro-optical modulator. In the case of this method, the frequency interval is determined by the drive frequency of the electro-optical modulator. The drive frequency of the electro-optical modulator can be easily adjusted with a function generator or the like.

In the case of a method using an electro-optical modulator, the range having practically significant intensity is determined by the original frequency of the incident single frequency laser and the operating wavelength range of the electro-optical modulator. For the single frequency laser, for example, a semiconductor laser or the like using a Fabry-Perot resonator or an external resonator can be used. The oscillation wavelength of such a laser can be selected from various wavelengths from the visible light region to the near infrared region. Alternatively, of the foregoing rare earth-doped optical fiber lasers, one having a resonator designed to have a narrow linewidth may be used. An electro-optical modulator can be operated in various wavelength ranges from the visible range to the infrared range.

Also, by methods other than the above ones, it is possible to generate the first light L1 and the second light L2, and if the wavelength range is the visible light range, the frequency is within a range approximately from 400 THz to 750 THz. In the case of near infrared light, the frequency is within a range approximately from 120 THz to 400 THz. In the case of far infrared light, the frequency is within a range approximately from 3 THz to 120 THz.

The wavelength ranges in which the first light L1 and the second light L2 have practically significant intensity may be determined by converting or limiting the frequency range of the light generated by the foregoing methods. For example, the range in which the output of a titanium-doped sapphire laser and a rare earth-doped optical fiber laser has practically significant intensity is the near infrared region. In the range in which the output of these lasers has practically significant intensity, imaging elements including single crystal silicon has little or almost no sensitivity. In the case of converting the wavelength of light in the near infrared region by second harmonic generation (SHG), it is possible to obtain light in the visible region or at a wavelength shorter than 1100 nm at which an imaging element including single crystal silicon has a sufficient sensitivity.

Wavelength conversion by SHG doubles the frequency of light. For example, light in the range of approximately from 273 THz to 455 THz from a titanium-doped sapphire laser is converted into light in the range approximately from 546 THz to 910 THz. Available nonlinear optical effects are not limited to SHG, but other effects such as sum frequency generation and difference frequency generation may be used. Alternatively, light subjected to wavelength conversion by using a method other than nonlinear optical effects, for example, Raman scattering or the like, may be used as the first light L1. Since these wavelength conversion techniques are well known, detailed description is omitted.

The first light source 21 may further include an optical element for limiting the frequency range or wavelength range of the discrete frequency components having practically significant intensity. For example, an optical element such as a band pass filter, a long pass filter, or a short pass filter may be used as an optical element for limiting the frequency range or wavelength range. These optical elements may be ones utilizing the interference of dielectric multilayer film or the absorption of colored glass or the like. For example, by limiting the output of a titanium-doped sapphire laser to the range from 900 nanometers to 1000 nanometers, the frequency range can be limited to a range approximately from 300 THz to 333 THZ.

The imaging system of the present disclosure enables imaging with light at a specific wavelength, based on the assumption that each component of the third light L3 generated by mixing the first light L1 of the first light source 21 and the second light L2 of the second light source 22 has each different beat frequency. Hence, in the case where a plurality of components in the third light L3 have the same or approximately the same beat frequency, the plurality of components are reflected on the imaging result, making it difficult to perform imaging in a desired condition. Hence, by limiting the wavelength range of the first light L1 of the first light source 21 or the second light L2 of the second light source 22, it is possible to prevent a plurality of components of the third light L3 from having the same or approximately the same beat frequency.

Similarly, in the case where the beat frequency of a component in the third light L3 is an integral multiple or approximately an integral multiple of the beat frequency of another component in the same third light L3, there is a possibility, because of the presence of harmonic components of the sensitivity modulation, that these components having the relationship of an integral multiple may be mixed into the imaging result. In this case, too, it is possible to prevent components having a relationship of an integral multiple from being mixed into the imaging result by limiting the wavelength range of the first light L1 of the first light source 21 or the second light L2 of the second light source 22.

The frequency intervals f1_rep and f2_rep can be adjusted by selecting the specification and usage of the light sources depending on the purpose of imaging and the characteristics of the subject.

For example, the frequency interval of a mode-locked laser is mainly determined by the resonator length. Hence, in the case where mode-locked lasers are used for the first light source 21 and the second light source 22, the resonators are selected to have desired frequency intervals f1_rep and f2_rep. The resonator length is mostly determined in the production of the resonator but can be adjusted by using a technique such as temperature adjustment.

In the method using an electro-optical modulator, the frequency interval is determined by the drive frequency. As mentioned earlier, the drive frequency can be easily adjusted by using a function generator or the like. Hence, in the case of using an electro-optical modulator, it is also possible to change the frequency interval for every imaging operation by changing the drive frequency.

If wavelength conversion elements such as SHG are used to convert the wavelength ranges in which the first light L1 and the second light L2 have practically significant intensity, the frequency intervals are also converted. For example, SHG provides light having a frequency interval twice that of inputted light.

In the present disclosure, the values of the frequency intervals f1_rep and f2_rep are selected to be larger than the width $\delta f$ frequency fluctuations of the sensitivity modulation in the imaging device 102 described later.

The values of the frequency intervals f1_rep and f2_rep may be set to be smaller than the width $\delta f$ the range in which the frequency of the sensitivity modulation described later can be set. For example, in the case where the frequency of the sensitivity modulation can be set in the range from 0 to 100 MHZ, and the frequency fluctuations of the sensitivity modulation is 10 Hz, f1_rep and f2_rep can be set to values, for example, from several tens Hz to several MHz or so.

The first light source 21 or the second light source 22 may further include an optical element for adjusting the intensity of the generated first light L1 or second light L2. For example, the first light source 21 may include an optical element for adjusting the intensity such as an aperture or an ND filter or may include a device for intensifying light such as a fiber optical amplifier. The second light source 22 and the first light source 21 may be the same kind of light source of may be different kinds. The forgoing optical element that limits the frequency range, the foregoing optical element for adjusting the emission intensity of laser light, and/or the like may be included in only one of the first light source 21 and the second light source 22 or may be included in both of them or none of them.

The first light source 21 and the second light source 22 may share part of their constituents. For example, in the case of a method using electro-optical modulators, the configuration may be such that the first light source 21 and the second light source 22 share a single frequency laser that emits light into electro-optical modulators, and only the modulation frequencies of their electro-optical modulators are set to be different from each other.

<Mixing Optical System 24>

Figure 2:
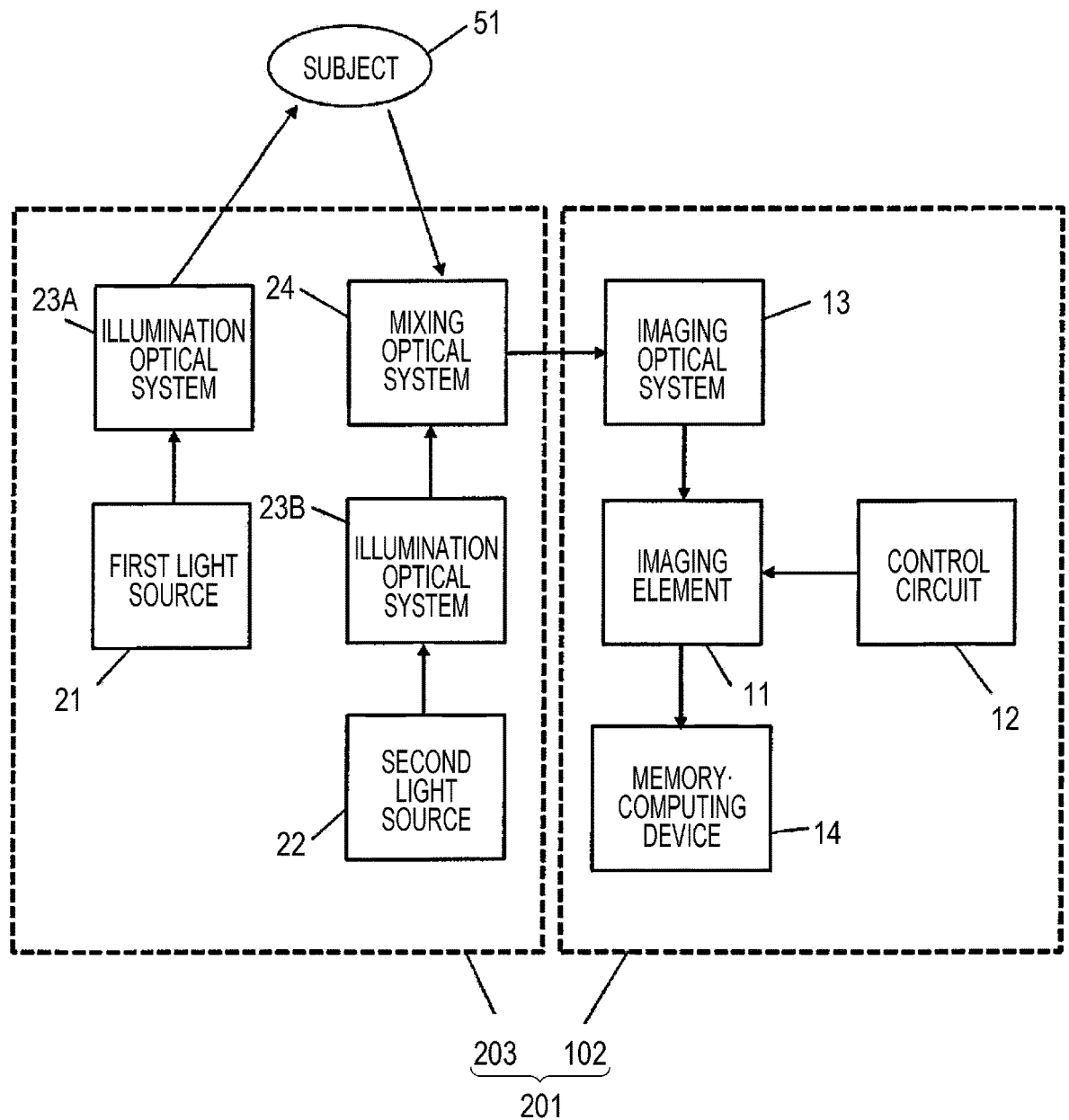
FIG. 2 is a block diagram showing another example of an imaging system according to the embodiment of the present disclosure.

The mixing optical system 24 mixes the first light L1 and the second light L2 and generates the third light L3. As shown in FIG. 1, the mixing optical system 24 is disposed at a position on the optical path between the subject 51 and the first light source 21 and on the optical path between the subject 51 and the second light source. In FIG. 1, the third light L3 is reflected on the subject 51, and the imaging device 102 captures the reflected light LA of the third light. However, the imaging device 102 may captures light obtained by the third light L3 being transmitted through the subject 51. Alternatively, as shown in FIG. 2, the configuration may be such that the first light L1 and the second light L2 are mixed after the first light L1 and the second light L2 return from the subject 51 and before the first light L1 and the second light L2 enter the imaging device 102. In other words, in an imaging system 201 shown in FIG. 2, the mixing optical system 24 of an illumination device 203 may mix first reflected light L5 obtained by the first light L1 being reflected on the subject 51 (or first transmitted light having passed through the subject 51) and the second light L2 that has not been reflected on the subject 51 or does not pass through the subject 51.

The mixing optical system 24 can be formed by using an optical element such as a beam splitter cube, a pellicle beam splitter, a half mirror, and an optical fiber coupler, for example.

The third light L3 is light into which the first light L1 and the second light L2 have mixed. If light at a frequency f1 and light at a frequency f2 having the same polarization direction are mixed, a component the intensity of which changes at the frequency |f1−f2| occurs. This is called a beat or an optical beat.

In theory, optical beats occur in all of the combinations between any frequency components included in the first light L1, the combinations between any frequency components included in the second light L2, and the combinations between any frequency component included in the first light L1 and any frequency component included in the second light L2. There can be a case where the number of combinations that generate an optical beat having a certain frequency is one and a case where the number of such combinations is plural.

In the present embodiment, the first light L1 and the second light L2 may be set such that the third light L3 will satisfy the following three conditions.

Condition 1: The frequency range in which the sensitivity modulation of the imaging device 102 can be set includes at least one of the frequencies of the optical beats included in the third light L3.

Condition 2: Of the optical beats of the third light L3 included in the frequency range in which the sensitivity modulation of the imaging device 102 can be set, at least one or a plurality of optical beats each are generated by only one combination of frequencies of the first light L1 and the second light L2.

Condition 3: There are a plurality of optical beats of the third light L3 included in the frequency range in which the sensitivity modulation of the imaging device 102 can be set, each of the optical beats is generated only one combination of frequencies of the first light L1 and the second light L2, the optical beats each generated by only one combination are adjacent to one another, and of those optical beats, the distances between the frequency of at least one optical beat and the frequencies of the adjacent optical beats are larger than the width $\delta f$ of the frequency fluctuations of the sensitivity modulation.

For example, in the case where the frequency interval of the first light L1 and the frequency interval of the second light L2 are the same, there are a plurality of combinations of frequencies that cause optical beats with the same frequency, and thus this case does not satisfy Condition 2.

However, if the frequency interval of the frequency components of the first light L1 and the frequency interval of the frequency components of the second light L2 are different, it is possible to set the first light L1 and the second light L2 such that the combinations of the frequency components included in the first light L1 and the frequency components included in the second light L2 satisfy the above condition.

Figure 5:
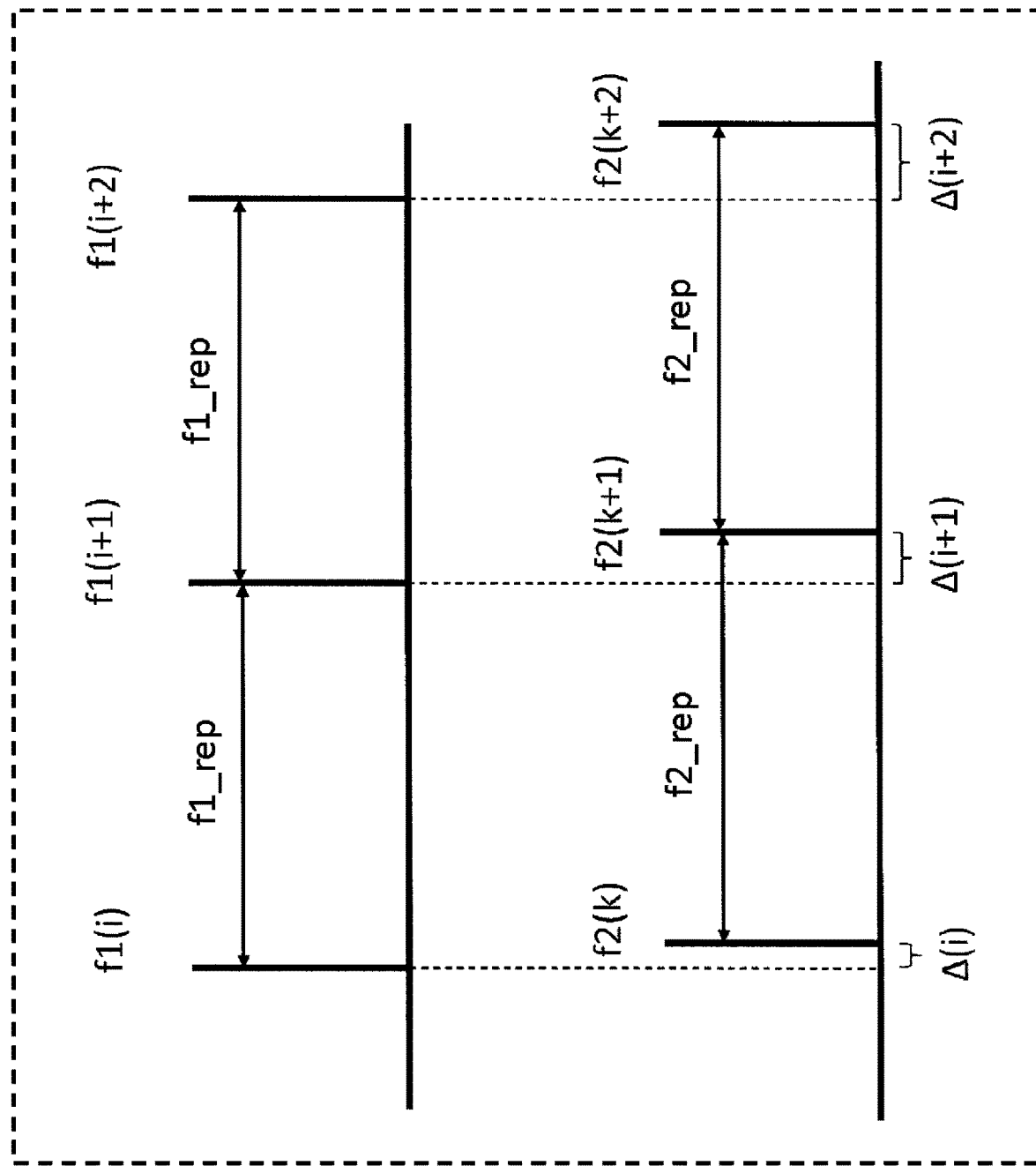
FIG. 5 is a conceptual diagram for explaining generation of optical beats included in third light.

Such an example will be described with reference to FIG. 5. The frequency difference between the i-th frequency component f1(i) of the first light L1 and the frequency component f2(k) of the second light L2 which is the frequency component closest to the frequency component f1(i) of the first light L1, in other words, the frequency of the optical beat described above, is defined as $\Delta(i)$. In other words, $\Delta(i)$ is the lowest frequency of those of the optical beats generated by the i-the frequency component f1(i) of the first light L1 and a frequency component of the second light L2.

In this case, by setting f1_rep and f2_rep to close values, the component of the second light L2 closest to the (i+1)-th frequency component f1(i+1) of the first light L1 can be the (k+1)-th frequency component f2(k+1).

In this case, the frequency difference $\Delta(i+1)$ between f1(i+1) and f2(k+1) satisfies the following relationship:

$$\Delta(i+1)=\Delta(i)+f2\_rep-f1\_rep=\Delta(i)+f\_delta,$$

where, f_delta=f2_rep−f1_rep.

Similarly, $\Delta(i+2)$ satisfies the following relationship:

$$\Delta(i+2)=\Delta(i)+2\times f\_delta.$$

In other words, in general, the following relationship can be satisfied:

$$\Delta(i+n)=\Delta(i)+n\times f\_delta.$$

As described above, by mixing the first light L1 and the second light L2 having discrete frequency components having different frequency intervals, a plurality of optical beats having different beat frequencies can be easily generated. However, where n is larger, there are cases where the frequency component of the second light L2 closest to f1(i+n) is not f2(k+n). In such a case, the uniqueness of the beat frequency will not be satisfied. In this case, such a situation can be avoided easily by limiting the frequency ranges of the first light L1 and the second light L2.

To satisfy Condition 3, the relationship f_delta>$\delta f$ needs to be satisfied. Since f_delta=f2_rep−f1_rep, the relationship can be satisfied by designing the first light source 21 that emits the first light L1 and the second light source 22 that emits the second light L2 appropriately.

As of the time of the present disclosure, the width $\delta f$ of the frequency fluctuations of the sensitivity modulation of a typical imaging device is, for example, several Hz or so. The maximum modulation frequency of an imaging device capable of sensitivity modulation is several MHz to 100 MHz or so. Hence, f_delta can be a value from several Hz to 100 MHz or so.

However, considering that imaging is performed by selecting an optical beat among a plurality of optical beats by switching, f_delta may be lower than or equal to a fraction of the maximum modulation frequency at which the imaging device can be set.

Defining the maximum modulation frequency at which the imaging device can be set as f_max, the maximum number n_max of the frequency to which the imaging device can be switched is as follows:

$$n\_max \approx f\_max/f\_delta.$$

Meanwhile, since f_delta=f2_rep-f1_rep, f1_rep can be selected appropriately even if f_delta is determined. In the present disclosure, f1_rep has basically the same meaning as the frequency resolution of imaging. For example, f1_rep may be determined based on the necessary frequency resolution and the necessary frequency range in consideration of the characteristics of the subject, the purpose of imaging, and other factors.

In the present disclosure, it is possible to obtain a higher frequency resolution by making f1_rep smaller, but to satisfy Conditions 1 to 3, it is necessary to limit the wavelength range in which the first light L1 has practically significant intensity.

Conversely, if f1_rep is larger, the frequency resolution is lower, but the wavelength range in which the first light L1 has practically significant intensity and that satisfies Conditions 1 to 3 can be wider.

Hence, f1_rep may be selected by who implements the present disclosure with the purpose or other factors taken into account.

The necessary frequency resolution can be determined, for example, as follows.

Each molecule absorbs light at a specific frequency in a resonating fashion. This resonant absorption is different depending on the kind of molecule. Thus, when light at a certain frequency is projected to a subject, if there are a large number of molecules that resonate and absorb the light at the frequency, the reflectance and the transmittance decrease. Hence, from an imaging result of the light at the frequency, it is possible to obtain information on the distribution of molecules having resonance absorption at the wavelength.

Figure 7:
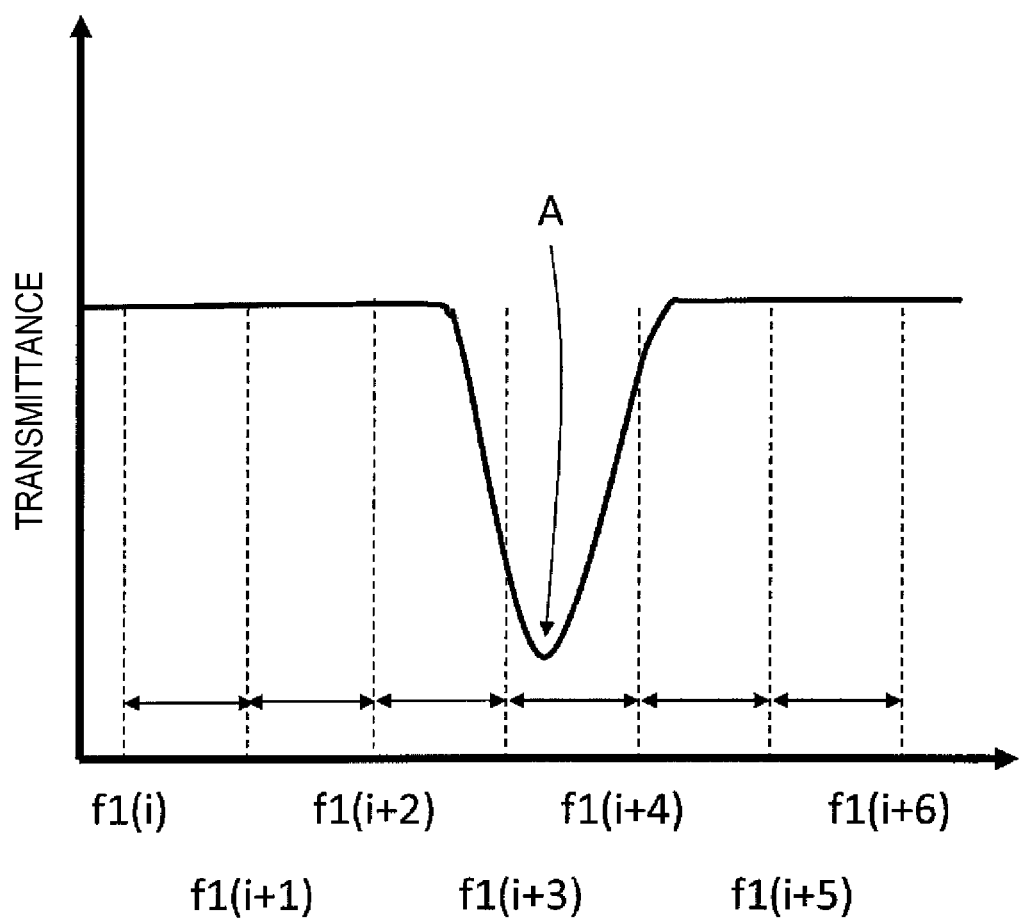
FIG. 7 is a conceptual diagram showing the relationship between a transmission spectrum resulting from the resonant absorption of a molecule and the frequencies of the optical beats used for imaging.

An imaging result at a certain frequency is affected by not only changes in the reflectance and the transmittance by resonance absorption but also non-resonant absorption and reflection. FIG. 7 is a conceptual diagram showing the relationship between a transmission spectrum resulting from the resonant absorption of a molecule and the frequencies of optical beats used for imaging. As shown in FIG. 7, resonant absorption has a certain width. In light of this, by comparing an imaging result at a first light frequency within the range in which the resonant absorption exhibits strong values with an imaging result at a second frequency that is close to the first light frequency but at which the resonant absorption is weaker than at the first light frequency or at which resonant absorption does not occurs, it is possible to reduce the effects of non-resonant absorption and reflection and to extract information more on the resonant absorption. In this case, if, for example, the frequency resolution is set to be narrower than the width δf the resonant absorption for the purpose of the information extraction, it is possible to perform each of an imaging operation in the range in which the resonant absorption at the first frequency is strong and an imaging operation in the range in which the resonant absorption at the second frequency is weak or resonant absorption does not occur.

In the present embodiment, the frequencies corresponding to one optical beat are based on the two different frequencies, specifically, f1(i) and f2(k). However, if the following relation holds:

$$\Delta(i) \ll f1(i),$$

the two frequencies can be regarded as an approximately single frequency on spectroscopic analysis. As described earlier, since f1(i) is a value of several hundred THz or so, even if Δ(i) is 100 MHz, this condition is satisfied. Thus, one beat frequency can specify a light component at an approximately single frequency in the third light L3.

Figure 6:
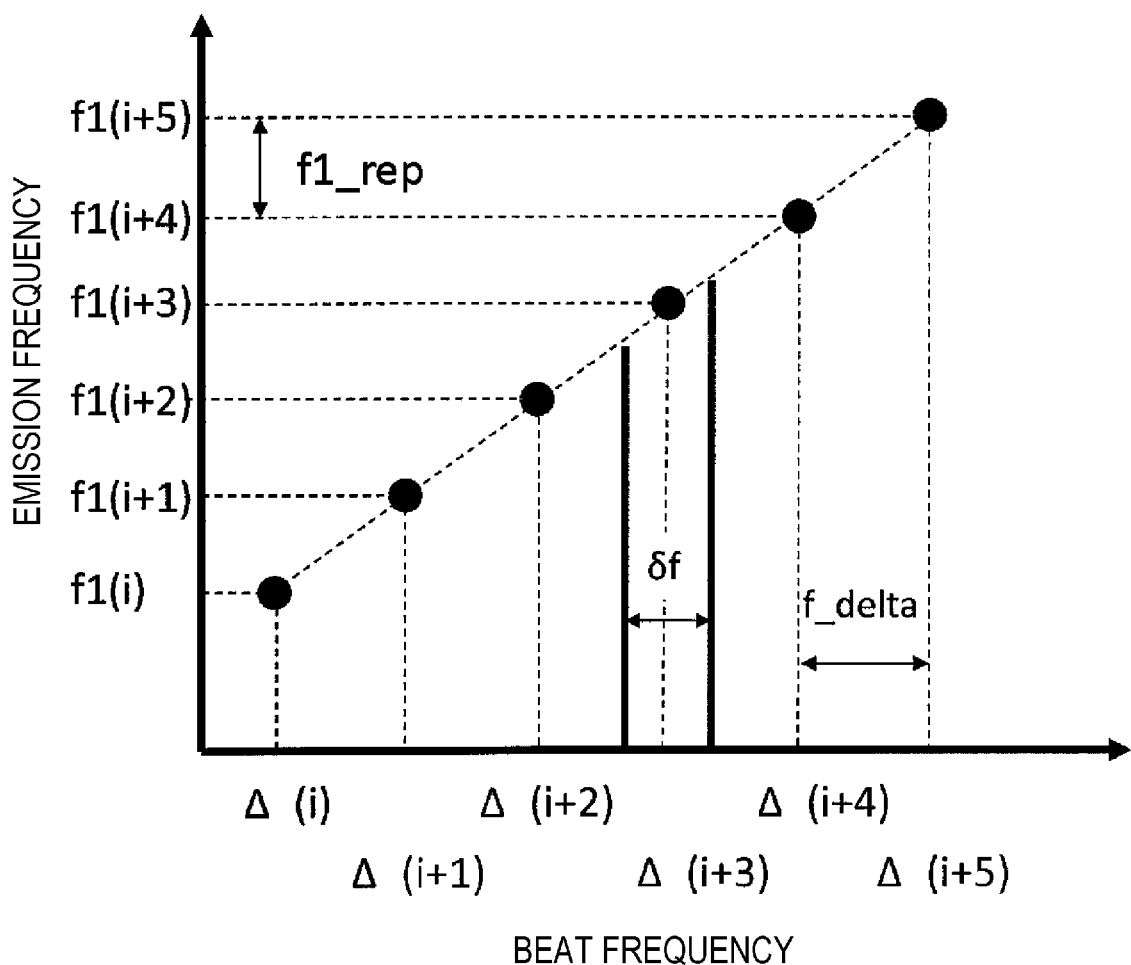
FIG. 6 is a conceptual diagram showing the relationship between the beat frequencies and the frequencies of optical beats included in the third light.

FIG. 6 shows the relationship between the beat frequencies and the frequencies of a plurality of optical beats included in the third light L3. As shown in FIG. 6, the third light L3 includes a plurality of optical beats. The optical beats have frequencies f1(i), f1(i+1), f1(i+2), and so on different from one another and beat frequencies Δ(i), Δ(i+1), Δ(i+2), and so on different from one another. The interval between the beat frequencies of the plurality of optical beats is defined by f_delta as described above, and the interval between the frequencies of the plurality of optical beats is indicated as f1_rep. The value f_delta is sufficiently small compared to f1_rep. In FIG. 6, to make it easy to understand, the frequency interval on the horizontal axis is shown enlarged sufficiently relative to the frequency interval on the vertical axis. In addition, since, the frequencies of the optical beats are large enough compared to the beat frequency Δ(i), the frequencies f1(i), f1(i+1), f1(i+2), and so on can be regarded as the same as f2(k), f2(k+1), f2(k+2), and so on. A specific example will be shown below.

Assume that the frequency interval of the first light L1 is 100 MHZ, the frequency range in which the first light L1 has significant intensity is from 200.002 THz (a wavelength of approximately 1.5 μm) to 203.0019 THz (a wavelength of approximately 1.48 μm), the frequency interval of the second light L2 is 100.001 MHZ, and the frequency range in which the second light L2 has significant intensity is from 200.002 THz (a wavelength of approximately 1.5 μm) to 203.002 THz (a wavelength of approximately 1.48 μm). Assume that the carrier-envelope offsets of the first light L1 and the second light L2 are both 0.

In this case, the number n (hereinafter n1) corresponding to the frequency range in which the first light L1 has significant intensity is from n1=2000020 to n1=2030019. The number n (hereinafter n2) corresponding to the frequency range in which the second light L2 has significant intensity is from n2=2000000 to n2=2029999.

In this case, f1(i)=100,000,000×i, and f2(k)=100,001,000×k. In the case where i=2,000,020, and k=2,000,000, f1 and f2 are both 200.002 THz, and Δ(i)=0. In the case where i=2,00,021, and k=2,000,001, Δ(i)=1000.

In general, Δ(i)=1000×(i−2,000,020) holds. The maximum value n_max of n determined from the frequency ranges in which the first light L1 and the second light L2 have significant intensity is 2,030,019. In this case, the frequency of the optical beat is 29,999,000 Hz.

In the case where the frequency of sensitivity modulation can be set in the range from 0 to 30 MHz, and the width δf frequency fluctuations is 10 Hz, it is possible to perform imaging, differentiating all the above optical beats.

The strongest optical beat component of the third light L3 occur when the polarization direction of the first light L1 and the polarization direction of the second light L2 are in agreement with each other. In light of this, the mixing optical system 24 may include an optical element for adjusting at least one of the polarization direction of the first light L1 or the second light L2. The optical element for adjusting the polarization direction is, for example, a polarizer, a ½ wave plate, a ¼ wave plate, or the like.

The optical beat components of the third light L3 are generated efficiently in the case where the intensity of the first light L1 and the intensity of the second light L2 are approximately the same, in other words, the closer to 1 the intensity ratio is, the more efficiently the optical beat components of the third light L3 are generated. In light of this, the mixing optical system 24 may include an optical element for adjusting the intensity of at least one of the first light L1 or the second light L2. Examples of an optical element for adjusting the intensity include an aperture and an ND filter.

The mixing optical system 24 may, but do not have to, include an optical element for adjusting the polarization direction and an optical element for adjusting the intensity. Alternatively, these optical elements, as described above, may be included in the first light source 21 or the second light source 22.

The third light L3 can have practically significant intensity in the frequency range or wavelength range in which both the first light L1 and the second light L2 have practically significant intensity.

<Illumination Optical System 23>

The illumination device 103 may include an illumination optical system 23. The illumination optical system 23 projects the third light L3 emitted from the mixing optical system 24 toward the subject 51. The illumination optical system 23 can be formed by using a refractive optical element such as a lens, a reflection optical element such as a curved mirror, a diffractive optical element such as a phase Fresnel lens, a diffusion optical element such as a diffuser, or the like.

The illumination optical system 23 may include, if necessary, a shutter, an aperture, an ND filter, a ½ wave plate or ¼ wave plate for adjusting the polarization state, or the like. The illumination optical system 23 may include a mechanism or the like for monitoring the intensity of the third light L3. The concrete configuration of the illumination optical system 23 is the same as or similar to that of a conventional optical system using general light, and hence, detailed description is omitted.

(Structure of Imaging Device 102)

The imaging device 102 includes the imaging element 11, the control circuit 12, and an imaging optical system 13.

<Imaging Optical System 13>

The imaging optical system 13 collects the reflected light L4 or the transmitted light obtained from the third light L3 projected by the illumination optical system 23 onto the subject 51 and forms an image on the light receiving surface of the imaging element 11. Alternatively, the imaging optical system 13 may collect fourth light generated on the subject 51 by projection of the third light L3 that is scattered light, fluorescent light, Raman scattered light, or the like and may make the fourth light incident on the imaging element 11.

The imaging optical system 13 can be formed by using a refractive optical element such as a lens or a reflection optical element such as a parabolic mirror. The imaging optical system 13 may include, if necessary, a shutter, an aperture, an ND filter, or the like. In addition, the imaging optical system 13 may include an optical filter such as a band pass filter, a short pass filter, or a long pass filter for blocking or attenuating light other than the third light L3. In the case where the reflected light L4, the transmitted light, or the like from the subject 51 is polarized, the imaging optical system 13 may further include a polarizing filter to block or attenuate light other than a specified polarization component.

Concrete design of the imaging optical system 13 is the same as or similar to the imaging optical system of a conventional optical imaging device using general light, and hence detailed description is omitted.

<Imaging Element 11>

The imaging element 11 has pixels arranged in two dimensions. Each pixel has a photoelectric conversion region that generates a charge according to the intensity of incident light and a storage region that stores the charge generated in the photoelectric conversion region.

The ratio of the amount of charge stored in the storage region to the amount of the light incident on the imaging element 11 is called the sensitivity. The imaging element 11 used in the present embodiment has significant sensitivity in at least part of the wavelength range in which the third light L3 has practically significant intensity. Significant sensitivity means a sensitivity to the degree that significant information can be extracted from the amount of the stored charge, and hence, the degree of significant sensitivity is different depending on the purpose of implementation of the present disclosure, the conditions of imaging, and other factors.

The imaging element 11 measures the amount of charge generated in each photoelectric conversion region during a period from the first time to the second time and stored in each storage region. The period from the first time to the second time is called the exposure period.

The first time, in the case where a mechanical shutter is controlled to physically control the entry of light onto the imaging element 11, and the time of starting the entry of light and the sensitivity of the imaging element 11 are variable, can be defined by the time of changing the sensitivity from 0 to a finite value, the time of resetting by discharging the charge in the storage region or setting the charge to a specified amount, the time of starting to measure the amount of charge stored in the storage region, or a combination of these.

The second time, in the case where a mechanical shutter is controlled to physically control the entry of light onto the imaging element, and the time of stopping the entry of light and the sensitivity of the imaging element 11 are variable, can be defined by the time of changing the sensitivity from the finite value to 0, the time of transferring the charge in the storage region to a structure for measuring the amount of charge, the time of finishing measuring the amount of charge stored in the storage region, or a combination of these. In the imaging element 11, each pixel does not have to have the structure for measuring the amount of charge, and the configuration may be such that a transistor circuit switches the connection between the storage region of each pixel and a structure for measuring the amount of charge.

The imaging element 11 has a function of cyclically changing the sensitivity according to a function of specified sensitivity modulation during the exposure period. The operation of changing the sensitivity during the exposure period is called the sensitivity modulation.

Figure 9A:
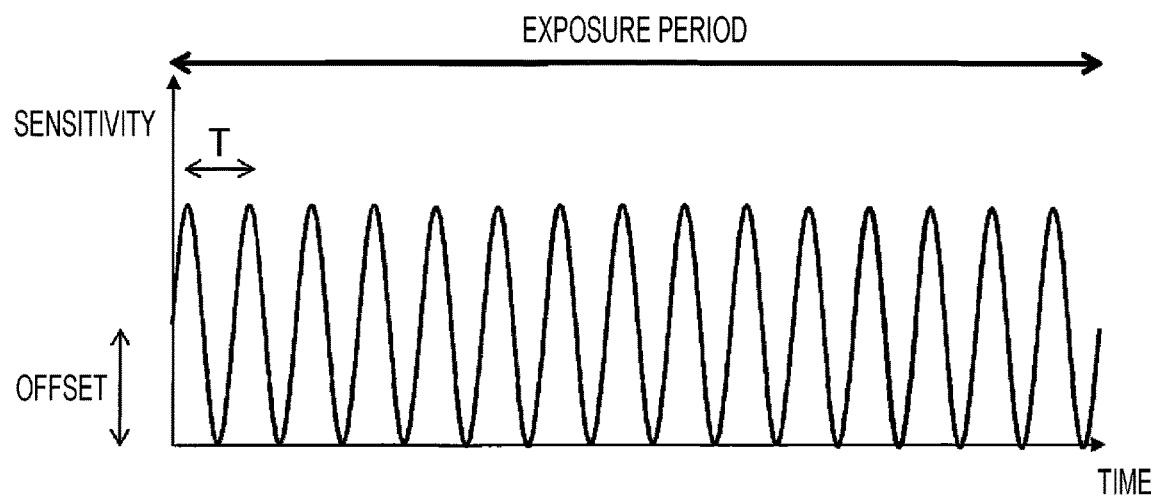
FIG. 9A is a diagram showing the relationship between time and the sensitivity of a function of sensitivity modulation.
Figure 9B:
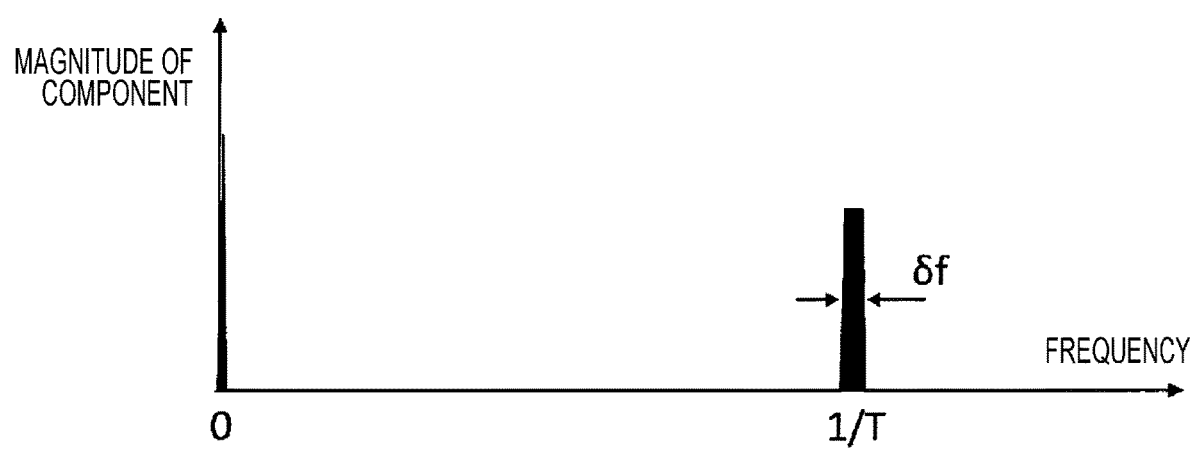
FIG. 9B is a diagram showing the distribution of the frequency components of the function showing in FIG. 9A.

FIGS. 9A and 9B show an example of sensitivity modulation. In the present disclosure, the sensitivity is modulated in the exposure period according to a function of sensitivity modulation, which is a function having a certain characteristic. FIG. 9A shows the relationship between time and the sensitivity of a function of sensitivity modulation, and FIG. 9B shows the distribution of the frequency components of this function.

As shown in FIG. 9A, for example, the function of sensitivity modulation is a function obtained by adding an offset to sine waves having a period T. The frequency components of the function of this sensitivity modulation, as shown in FIG. 9B, practically have a constant component independent of time at and near the frequency 0, which corresponds to the foregoing offset, and a component at and near the frequency 1/T which is in a specific frequency range. The component at and near the frequency 1/T has a width $\delta f$ of fluctuations by limitations of an actual device. The word "practically" means "to the degree that the imaging result is affected". Since the exposure time is actually finite, components are generated at frequencies other than 1/T, but these components become weaker as the exposure time becomes longer. Hence, by setting the exposure time to be sufficiently longer than the period T, these components will be practically not a problem. Note that since the degree that the components are practically not a problem is different depending on the application and purpose of the imaging system, imaging conditions, the subject, and other factors, the degree may be judged by the user or the like of the imaging system, and the exposure time may be determined based on the judgment. In the following description, frequency components generated because of the finite exposure time are ignored.

Figure 10A:
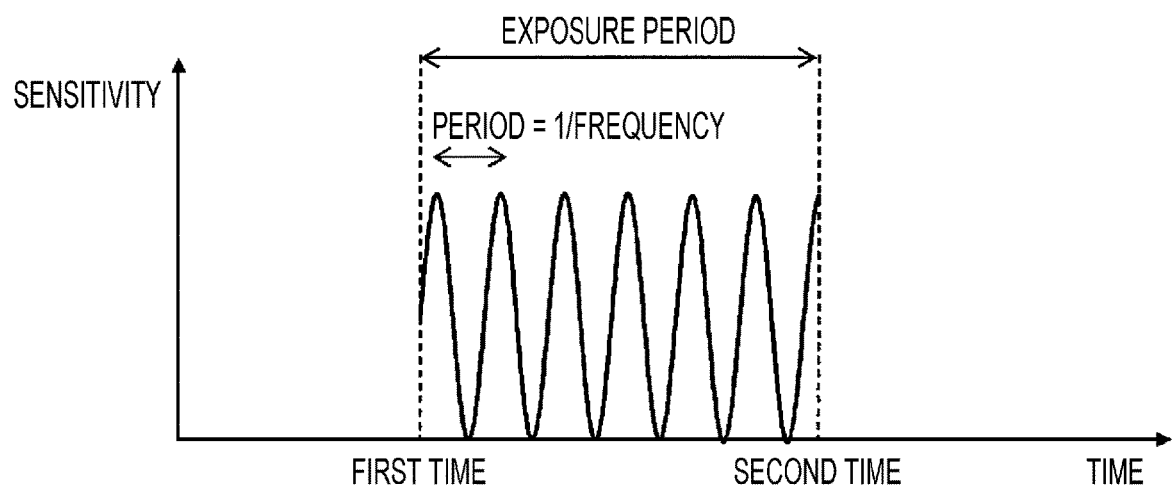
FIG. 10A is a diagram showing an example of a function of sensitivity modulation.
Figure 10B:
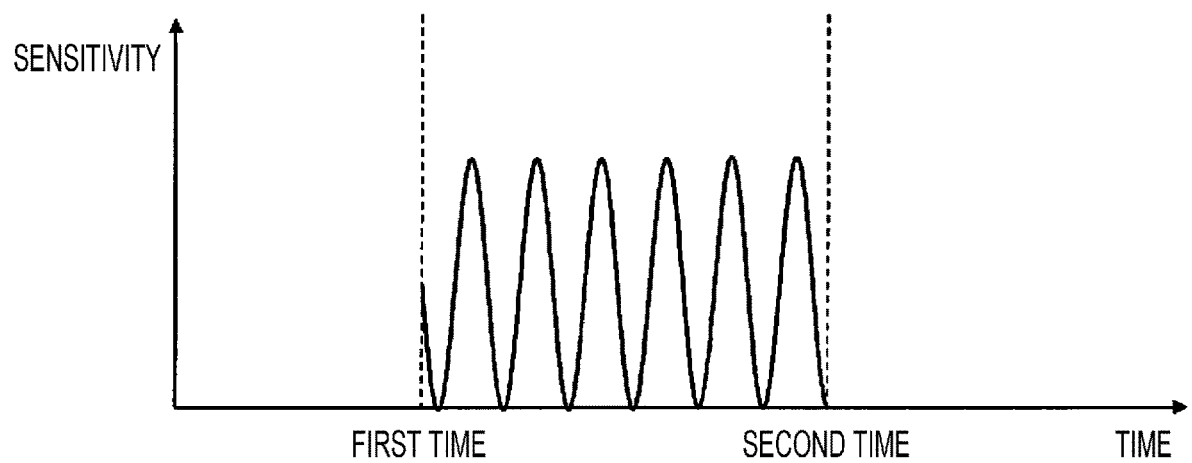
FIG. 10B is a diagram showing an example of a function of sensitivity modulation having a phase different from that of the function shown in FIG. 10A.

The function of the sensitivity modulation has a degree of freedom in terms of the phase. In the present disclosure, in what phase the function starts at the first time which is the start time of exposure is called the phase of the function of sensitivity modulation. FIGS. 10A and 10B show examples of functions having the same sensitivity modulation but having phases different from each other by ½ the period. Note that in the following description, the frequency at which the function of sensitivity modulation practically has a component out of the frequency components of the function may be called the frequency of sensitivity modulation in some cases.

Examples of methods for sensitivity modulation include a method involving changing the quantum efficiency which is the ratio of charge generation to the amount of incident light, a method involving changing the ratio of the amount of charge stored in the storage region to the charge generated by incident light, a method involving modulating amplification in a structure in which the charge generated by incident light is amplified and then stored in the storage region, and a method involving changing the amount of light incident on the imaging element.

Examples of methods of changing the quantum efficiency include a method involving changing a bias voltage of a stacked image sensor. For example, the stacked image sensor disclosed Japanese Unexamined Patent Application Publication No. 2017-208812 includes a photoelectric conversion unit including a photoelectric conversion layer formed of an organic semiconductor film and a pair of electrodes on both sides of the photoelectric conversion layer. The sensitivity of the photoelectric conversion layer can be changed by the voltage applied to the pair of electrodes.

Examples of methods of changing the ratio of the amount of charge stored in the storage region include ones using a charge discarding mechanism and ones using a charge distribution mechanism.

The charge discarding mechanism transports a certain proportion of the charge generated in the photoelectric conversion region to a charge discarding region and does not transport it to a storage region, in other words, discards part of the stored charge. When the proportion of the discarded charge increases, the amount of charge stored in the storage region decreases, and the sensitivity of the imaging element decreases. In an image sensor having a charge discarding mechanism, the sensitivity can be modulated by changing the proportion of discarded charge. For example, Japanese Patent No. 3832441 shows, as an example, an imaging element including such a charge discarding mechanism.

In the charge distribution mechanism, each pixel has a plurality of storage regions, the proportion of the charge transported to each storage region with respect to the charge generated in the photoelectric conversion region is changed. For example, consider a case in which a pixel has a first storage region and a second storage region. If all the charge generated in the photoelectric conversion region is transported to the first storage region, the sensitivity based on the first storage region is highest, but the charge transported to the second storage region is 0, and the sensitivity based on the second storage region is 0. Conversely, if all the charge generated in the photoelectric conversion region is transported to the second storage region, the sensitivity based on the first storage region is 0, and the sensitivity based on the second storage region is highest. Thus, an image sensor having a charge distribution mechanism is equal to the case in which a plurality of pixels the sensitivities of which are modulated at the same frequency but in different phases are operating at the same time.

There are cases where it is difficult for ones having a charge discarding mechanism and ones having a charge distribution mechanism to change the sensitivity steplessly. In such a case, as shown in FIG. 13, the sensitivity may be modulated in square waves. FIG. 13 is a diagram showing a function of sensitivity modulation having square waves and the frequency components included in the function of sensitivity modulation. The square waves having a frequency of 1/T3 are a mixture of sine waves at the fundamental frequency 1/T3 and harmonic components having odd multiples of the fundamental frequency. As described earlier, by limiting the wavelength range of the first light L1 of the first light source 21 or the second light L2 of the second light source 22, it is possible to create a situation in which harmonic components are not in agreement with the beat frequencies. In that case, the imaging result is the same as in the case of sine waves at a single frequency. In square waves, the proportion of a harmonic component is smaller than the proportion of the fundamental frequency component. Thus, even if there is a beat frequency in agreement with a harmonic component, the imaging result includes a component of the beat frequency in agreement with the fundamental frequency component in the largest proportion.

As described later, the present embodiment may provide a plurality of imaging results obtained by sensitivity modulation at the same frequency but in different phases. An image sensor having a charge distribution mechanism is capable of providing two or more imaging results in one imaging operation and hence can be used for the present embodiment.

As for an image sensor having a charge distribution mechanism, for example, Japanese Patent No. 4235729 discloses an image sensor having a charge distribution mechanism including single crystal silicon, and US Patent Publication 2019/0252455 discloses a stacked image sensor including a charge distribution mechanism.

In addition, as an example of a method of modulating the amplification factor, the bias voltage is modulated by using pixels having a charge amplification function, as in the avalanche photodiode, based on that the charge amplification factor is dependent on the bias voltage. Examples of image sensors having a charge amplification function in pixels include an electron multiplying CCD (EMCCD). Alternatively, as in an intensified CCD (ICCD), the configuration may be such that a charge amplification mechanism is provided outside the pixel, and the multiplication factor of the mechanism is modulated. As an example of a method of changing the amount of light incident on the imaging element, a variable neutral-density filter is provided in the optical path, and the light reduction ratio is modulated.

<Control Circuit 12>

The control circuit 12 has a function of changing the sensitivity of the imaging element 11 according to the function of sensitivity modulation the frequency range of which practically having a component overlaps with the frequency of intensity change in at least one optical beat included in the third light. Specifically, the control circuit 12 generates a control signal according to the method of the sensitivity modulation of the imaging element 11 and applies the control signal to the imaging element 11 to change the sensitivity of the imaging element 11 according to the desired function of sensitivity modulation.

The control circuit 12 may have a capability of changing the frequency practically having a component, in the function of sensitivity modulation.

Figure 11A:
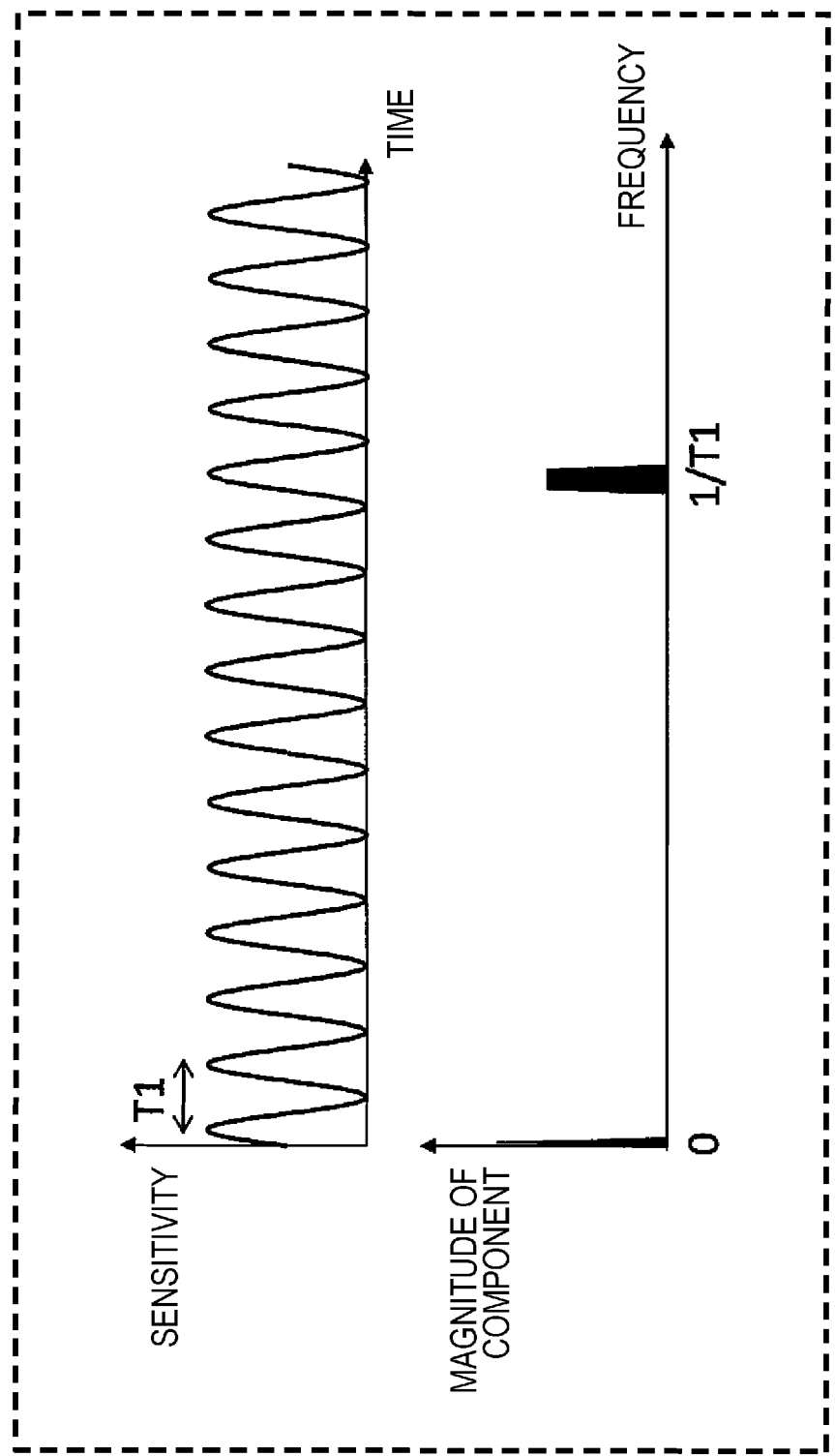
FIG. 11A is a diagram showing an example of a function of sensitivity modulation practically having components only at and near the frequency 0 and the frequency 1/T1.

FIG. 11A shows a function of sensitivity modulation practically having components only at and near the frequency 0 and the frequency 1/T1, and FIG. 11B shows a function of sensitivity modulation practically having components only at and near the frequency 0 and the frequency 1/T2, which is different from the frequency 1/T1.

The control circuit 12 may have a function of controlling the phase of sensitivity modulation. The control circuit 12 may have a configuration in which as the phase of sensitivity modulation, at least two values different from each other can be set. As described earlier, FIGS. 10A and 10B show two examples of sensitivity modulation practically having components at the same frequencies but having phases different from each other by a ½ period.

Alternatively, in the case of performing a plurality of imaging operations, the control circuit 12 may have a function of making constant the difference between the phase of sensitivity modulation in an imaging operation and the phase of sensitivity modulation in another imaging operation. For example, the configuration may be such that the phase of sensitivity modulation in the first imaging can be different for each imaging operation, but the phase of sensitivity modulation in the second imaging may be controlled to be shifted from the phase of the sensitivity modulation in the first imaging by a ½ period.

For example, the configuration may be such that generation a reference signal for sensitivity modulation is synchronized with the operation of a circuit for controlling the start of exposure, and at the start of exposure time, the function of sensitivity modulation is set to a fixed phase.

Alternatively, the configuration may be such that generation of the reference signal for sensitivity modulation is not synchronized with the operation of the circuit for controlling the start of exposure. The difference between the phase of sensitivity modulation in one imaging operation and the phase of sensitivity modulation in another imaging operation can be made constant by continuing generating the reference signal for sensitivity modulation over a span of the one imaging operation and the other imaging operation and controlling the exposure time of each of the two imaging operations and the interval between the imaging operations.

In the case of performing sensitivity modulation by the imaging element 11 changing the quantum efficiency, the control circuit 12, for example, changes a bias voltage applied to a stacked image sensor as a control signal at the frequency of the intensity change in at least one optical beat included in the third light. In the case of performing the sensitivity modulation by changing the ratio of the amount of the charge that the imaging element 11 stores in the storage region, the control circuit 12 generates a control signal to control the imaging element 11 such that the ratio of the amount of stored charge will change at the frequency of the intensity change in at least one optical beat included in the third light, and applied the control signal to the imaging element 11.

The third light, as described above, includes the optical beats the frequencies of which are represented by f(i), f(i+1), f(i+2), and so on. The beat frequencies of these optical beats are represented by $\Delta(i)$, $\Delta(i+1)$, $\Delta(i+2)$, and so on. The control circuit 12 modulates the sensitivity of the imaging element 11 during the exposure period of the imaging element 11 such that the sensitivity modulation practically has a component at only at least one of the frequencies represented by $\Delta(i)$, $\Delta(i+1)$, $\Delta(i+2)$, and so on, except the component independent of time.

<Memory·Computing Device 14>

The imaging device 102 may further include a memory·computing device 14, and the like. As described later, the amount of charge obtained by the imaging element 11 and image data based on the amount of the charge may be stored in the memory·computing device 14, or image processing may be performed on the image data by using the memory·computing device 14.

(Principle of Sensitivity Modulation Imaging)

The following explains that sensitivity modulating performed in the exposure period of the imaging element makes it possible to capture an image of a specific frequency component. First, the general principle of the sensitivity modulation imaging will be described.

Define the intensity of the light incident on the imaging element at time t as I(t) and the sensitivity at the time as S(t).

This imaging element generates a signal charge $Q(t)=I(t)\times S(t)$.

The imaging element stores this signal charge Q(t) during the exposure period and obtains an imaging result E(t) expressed by $$E(t)=\int Q(t)dt,$$

where, $\int$ means calculating the integral over the exposure period.

In this case, consider the case where the following expressions hold:

$$I(t)=I_0+\Sigma I_{in} \sin(2\pi f_{in}t+\Psi_{in}),$$

$$S(t)=S_0+S_a \sin(2\pi f_s t+\eta s),$$

where, $\Sigma$ means calculating the sum at all the frequencies, and I(t) includes a plurality of components the amplitudes $I_{in}$ (n=0, 1, 2, 3, . . . ) of which change at the frequencies $f_{in}$ (n=0, 1, 2, 3, . . . ) and in the phases $\psi_{in}$ (n=0, 1, 2, 3, . . . ).

Here, $I(t)\times S(t)$ is expressed as follows:

$$I(t)\times S(t)=I_0 S_0+I_0 S_a \sin(2\pi f_s t+\eta s)+S_0\Sigma I_{in} \sin(2\pi f_{in}t+\psi_{in})+\Sigma I_{in}S_a \sin(2\pi f_{in}t+\psi_{in})\sin(2\pi f_s t+\eta_s)=I_0 S_0+I_0 S_a \sin(2\pi f_s t+\eta_s)+S_0\Sigma I_i \sin(2\pi f_{in}t+\psi_{in})-\tfrac{1}{2}\Sigma I_{in}S_a \cos(2\pi(f_{in}+f_s)t+\psi_{in}+\eta_s)+\tfrac{1}{2}\Sigma I_{in}S_a \cos(2\pi(f_{in}-f_s)t+\psi_{in}-\eta_s)$$

Here, the first term $I_0 S_0$ is a component independent of frequency and also independent of time. Hence, it increases monotonously when being accumulated over the exposure time.

The second term $$+I_0 S_a \sin(2\pi f_s t+\eta_s)+S_0\Sigma I_{in} \sin(2\pi f_{in}t+\psi_{in})$$

and the third term $$-\tfrac{1}{2}\Sigma I_{in}S_a \cos(2\pi(f_{in}+f_s)t+\psi_{in}+\eta_s)$$

are terms dependent on frequency and thus take a positive value and a negative value alternately as time elapses. Hence, when they are accumulated over the exposure time, defining the exposure time as T, these terms become substantially 0 by time average in the ranges $f_{in}>1/T$, $f_s>1/T$. The exposure time is a value that can be set in the imaging system of the present embodiment and thus can be set to satisfy $f_{in}>1/T$, $f_s>1/T$.

The fourth term $$+\tfrac{1}{2}\Sigma I_{in}S_a \cos(2\pi(f_{in}-f_s)t+\psi_{in}-\pi_s)$$

becomes 0 by time average in the case that $|f_{in}-f_s|>1/T$. In the case that $|f_{in}-f_s|<1/T$, the fourth term does not become substantially 0. For example, in the case where the exposure time is 30 milliseconds, 1/T is approximately 33 Hz. If the difference between $f_{in}$ and $f_s$ is less than or equal to 33 Hz, the fourth term does not become substantially 0, and it increases by accumulating over the exposure time. Note that in the case that $f_{in}=f_s$, the fourth term does not become 0 regardless of the exposure time.

As above, when $I(t)\times S(t)$ is accumulated over the exposure time, only the components in the first term and the fourth term that satisfy $|f_{in}-f_s|<1/T$ remain. Here, $I_i$ is a component of the subject that changes at the frequency $f_{in}$. Thus, by setting the frequency $f_s$ of the sensitivity modulation such that $f_s$ satisfies $|f_{in}-f_s|<1/T$, it is possible to remove the components that change at the other frequencies.

The components of the first term can be removed, for example, by the following method.

Images of the subject on which the changes in the intensity of the light are the same are captured by using two sensitivity modulation functions $S_1$ and $S_2$ the frequencies of which are the same and only the phases of which are different from each other. For example, defining the phase of the first imaging operation as $\eta_{1j}$ and the phase of the second imaging operation as $\eta_{2j}$, the first term can be removed by taking the subtraction between $I(t)\times S1(t)$ and $I(t)\times S2(t)$ because the first term is independent of phase. The second term and the third term become 0 by time average. The fourth term will not be 0 because the fourth term becomes a different value when the phase is different.

Thus, it is possible to extract only the information on a specific component of light that changes at the frequency $f_{in}=f_s$, in other words, at the same frequency as that of the sensitivity modulation.

Note that in the case where the sensitivity $S(t)$ has a plurality of frequency components, the imaging result includes information on components of light having the same frequencies as the respective frequency components. In that case, the ratio of the information on each component of light included in the imaging result is proportional to the ratio of the magnitude of the frequency component included in the sensitivity $S(t)$. Thus, for example, in the case where the sensitivity $S(t)$, like square waves, has harmonic components having the odd multiples of the fundamental frequency in addition to the fundamental frequency component, the imaging result includes information on the light having the same frequencies as those of the harmonic components, and the information on each harmonic component is proportional to the ratio of the magnitude of the harmonic component. Since the proportion of each harmonic component in square waves is smaller than that of the fundamental frequency component, the imaging result includes the information on the light having the frequency in agreement with the fundamental frequency in the largest proportion.

Extraction of a specific frequency component by imaging utilizing sensitivity modulation described above is basically the one that the inventor of the present disclosure disclosed in Japanese Unexamined Patent Application Publication No. 2017-208812. The imaging system of the present embodiment is different from the one in Japanese Unexamined Patent Application Publication No. 2017-208812 in the following points.

In the case where the frequency $f_s$ of the sensitivity modulation has fluctuations having a width of $\delta f$, information is extracted on a component of light in the range in which the following relationship holds:

$$|f_{in}-f_s|<1/T.$$

In other words, the range of $f_{in}$ at which information is extracted also has a width $\delta f$.

Figure 12:
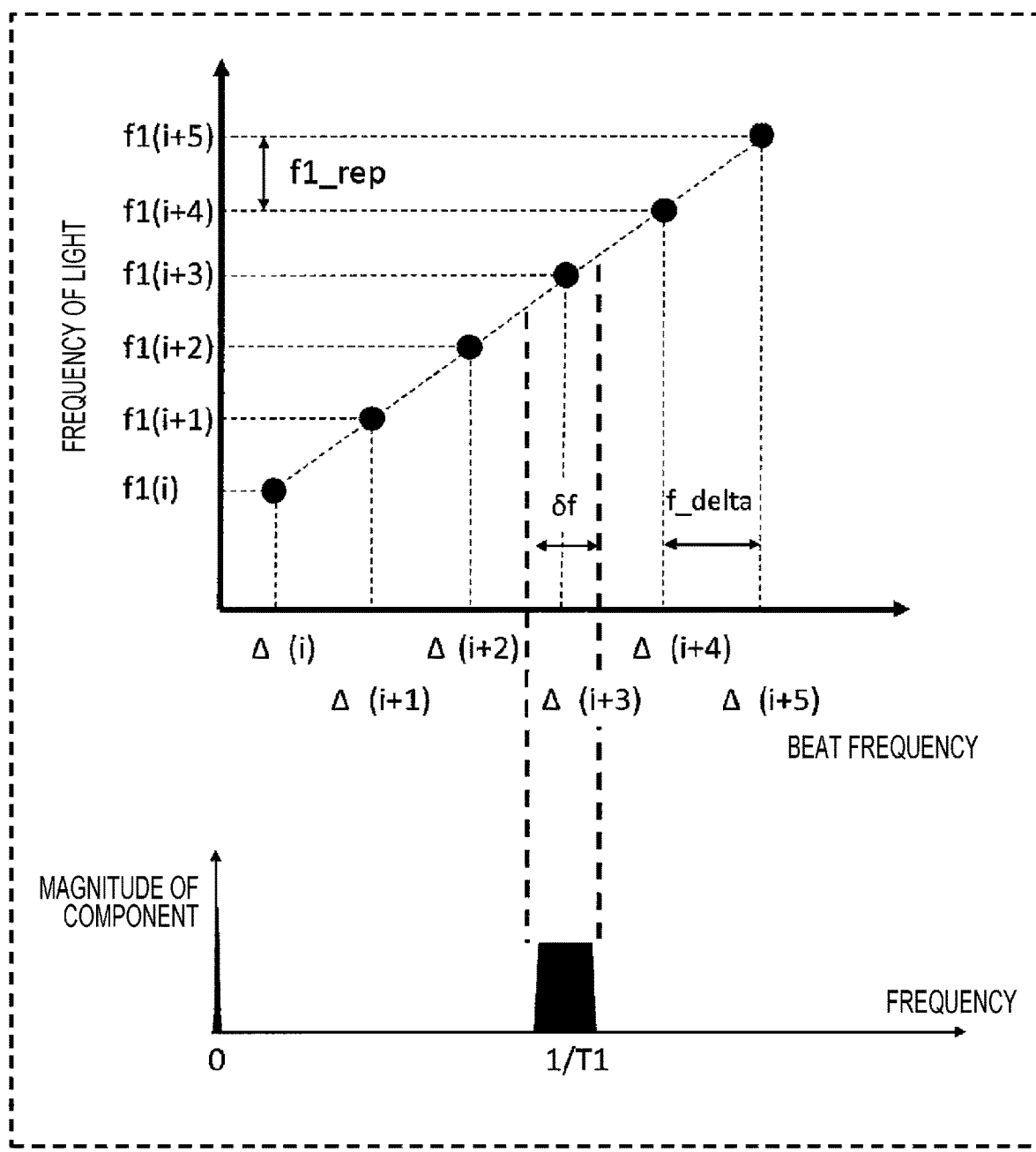
FIG. 12 is a diagram showing the relationship between the beat frequencies and the frequencies of a plurality of optical beats included in the third light and the frequency distribution of a function of sensitivity modulation.

FIG. 12 shows the relationship between the beat frequencies and the frequencies of a plurality of optical beats included in the third light L3 and the frequency distribution of a function of sensitivity modulation. As shown in FIG. 12, in the third light L3, each of the optical beats is apart from the adjoining components by a frequency interval f_delta. In this case, even if the frequency $f_s$ of the sensitivity modulation fluctuates in the width $\delta f$, if the fluctuation width is smaller than the frequency interval f_delta, it is possible to extract only the information at the frequency originally intended to extract and not to extract information at the adjoining frequencies.

(Imaging Method Using Imaging System 101)

Figure 8:
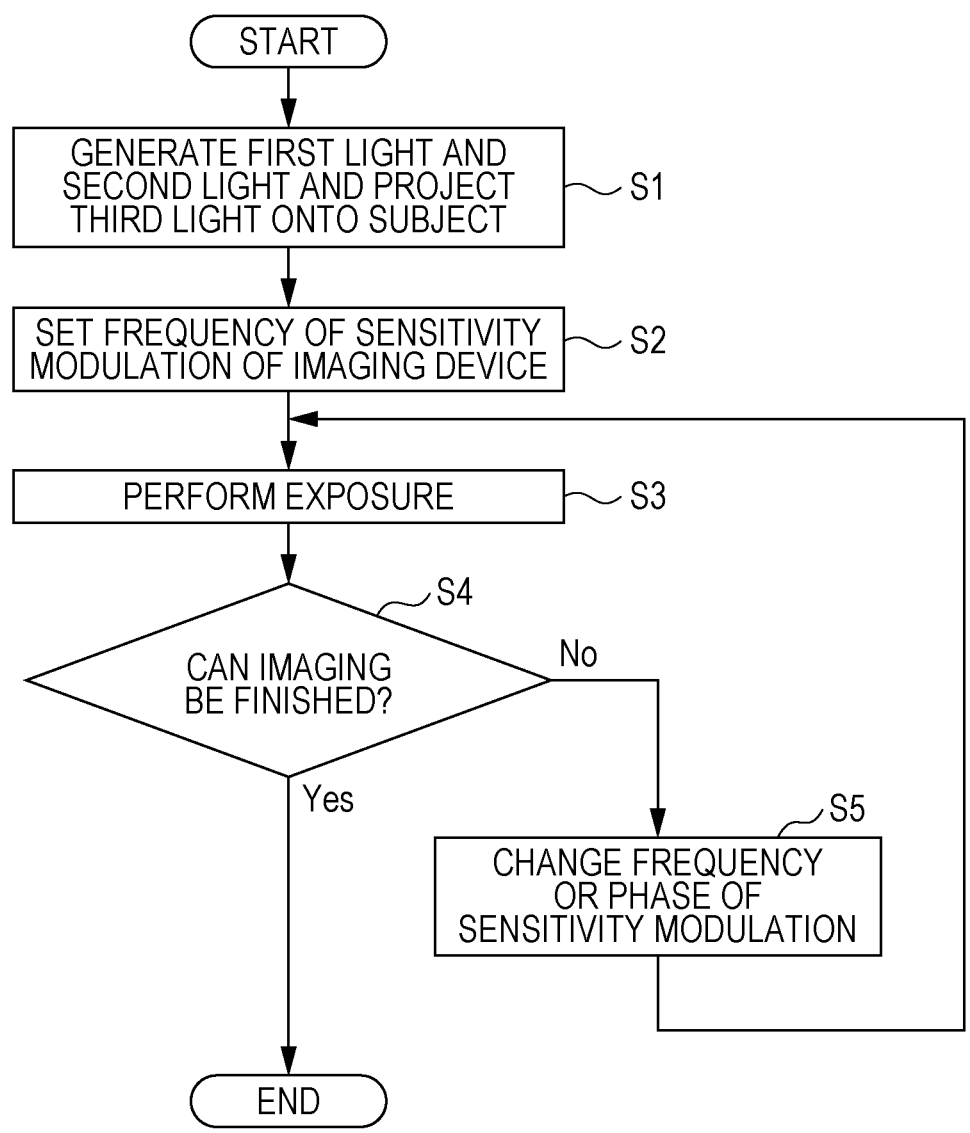
FIG. 8 is a flowchart showing an example of an imaging method according to the embodiment of the present disclosure.

An example of an imaging method using the imaging system 101 will be described. FIG. 8 is a flowchart showing an imaging method using the imaging system 101. The order of the steps may be changed as appropriate as far as imaging is possible. For example, setting of the frequency of sensitivity modulation in the imaging device may be performed before the first light and the second light are generated. As far as imaging is possible, a plurality of steps may be combined and executed, or a plurality of steps may be executed in parallel or at the same time.

<Generation of First Light and Second Light and Projection of Third Light to Subject (Step S1)>

The illumination device 103 is driven to make the first light source 21 and the second light source 22 emit the first light L1 and the second light L2. The first light L1 and the second light L2 is mixed by the mixing optical system 24 to generate the third light L3. The third light L3 is projected to the subject 51. The projection of the third light L3 to the subject 51 starts at the same time as, or before, the start of exposure for imaging by the imaging device 102 and continues until the end of the exposure.

Specifically, the first light L1 having a spectrum including a plurality of discrete first frequency components arranged at first frequency intervals and the second light L2 having a spectrum including a plurality of discrete second frequency components arranged at second frequency intervals, the second frequency interval being different from the first frequency interval, are generated by using the first light source 21 and the second light source 22. The generated first light L1 and second light L2 are mixed by using the mixing optical system 24 to generate the third light L3 including at least one optical beat the intensity of which changes at the beat frequency expressed by the difference between at least one of the discrete first frequency components and at least one of the discrete second frequency components. The third light L3 is projected to the subject 51 to obtain the reflected light L4 which is the third light reflected on or transmitted through the subject.

<Setting of Modulation Frequency of Sensitivity of Imaging Device 102 (Step S2)>

The modulation frequency of the sensitivity when performing exposure of the imaging element 11 of the imaging device 102 is determined according to the characteristics of the subject 51 and the purpose of the imaging, and the control circuit 12 is set according to the determination result. This modulation is started at the same time as, or before, the start of exposure. The sensitivity modulation continues until the end of the exposure.

The modulation frequency is determined, for example, through the following procedure.

First, the wavelength range for the purpose of the imaging is determined. For example, in the case where the purpose of the imaging is to obtain information on the distribution of a molecule having resonant absorption in a specific wavelength range in the subject 51, it is possible to obtain information on the distribution of the molecule by performing imaging at a wavelength included in the wavelength range of the resonant absorption.

In addition, by performing imaging at a wavelength that is close to the wavelength range of the resonant absorption but outside the resonant absorption or at a wavelength that shows only weak absorption, it is possible to obtain information on what is called the background noise. By subtracting the background noise from an imaging result at a wavelength included in the wavelength range of the resonant absorption, it is possible to and extract more emphasized information on the resonant absorption. As described above, a combination of wavelengths for imaging can be determined according to the purpose of imaging.

The wavelength of light and the frequency of the light satisfy the following relationship:

(the frequency of light)=(the speed of the light)/(the wavelength of the light).

Hence, once a combination of wavelengths of light is determined for the purpose of the imaging, it determines a combination of frequencies of light corresponding to the combination of wavelengths. Once the frequencies of light for the purpose of the imaging are determined, it is possible to determine the combination of beat frequencies of the optical beats corresponding to the frequencies of light.

The user first selects one frequency out of the combination of beat frequencies corresponding to the wavelength range for the purpose of the imaging and selects the function of sensitivity modulation having the frequency of sensitivity modulation that agrees with the selected frequency.

If necessary, the phase of the function of the sensitivity modulation is set to a specified value. Alternatively, in the method in which only the phase difference between a plurality of imaging operations is controlled, the function of sensitivity modulation for the first imaging operation may have any phase.

The control circuit 12 is set such that the sensitivity of the imaging element 11 changes according to the selected function of sensitivity modulation in the exposure period.

For example, the beat frequency of an optical beat having a frequency close to a local maximum frequency of the resonant absorption is determined, and the sensitivity of the imaging element 11 is modulated at the determined frequency. FIG. 7 is a schematic diagram showing the relationship between a transmission spectrum resulting from the resonant absorption of a molecule and the frequencies of a plurality of optical beats. As shown in FIG. 7, the transmittance is lowest at the local maximum frequency of the resonant absorption A. The frequency of the optical beat closest to the local maximum frequency of this resonant absorption A is, for example, f(i+3). In this case, as shown in FIG. 6, the optical beat at the frequency f1(i+3) has a beat frequency of $\Delta(i+3)$. Hence, the control circuit 12 is set such that the sensitivity of the imaging element 11 is modulated at the frequency $\Delta(i+3)$ and that the phase of the sensitivity modulation agrees with the phase of the optical beat.

In the case where the imaging device 102 is, for example, a dedicated device for performing imaging of the distribution of a specific molecule, this initial value may be set in advance in the control circuit 12. In this case, this step is not necessary.

<Exposure (Step S3)>

The imaging element 11 is initialized as necessary, and exposure is started. A mechanical shutter may be used to make light not enter the imaging element 11 until the start of exposure. Exposure is started by making the reflected light LA which is the third light reflected on the subject 51 incident on the imaging element 11 of the imaging device 102. The sensitivity of the imaging element 11 changes being synchronized with the beat frequency $\Delta(i+3)$ of the optical beat having the frequency f(i+3) in the third light L3. As for the optical beat at the frequency $\Delta(i+3)$ in the third light L3, in the period when the emission intensity is high, the exposure sensitivity is high, and when the emission intensity is low, the exposure sensitivity is also low. Thus, on the subject 51, the region including the foregoing molecule absorbs the optical beat at the frequency $\Delta(i+3)$, and the component of this optical beat is detected in the other regions. The optical beats at the other frequencies are not detected whether the region includes the molecule or not because the intensity change of the optical beat and the sensitivity change of the imaging element 11 are not synchronized.

As shown in FIG. 6, even if the modulation frequency of the sensitivity of the imaging element 11 fluctuates in the range of $\delta f$, the optical beat at the frequency f(i+2) or the frequency f(i+4) will not be detected with a significant sensitivity because the beat frequencies of the adjoining optical beats are located discretely.

After the exposure period finishes, the amount of charge stored in the storage region in the imaging element 11 is measured. This measurement result on the amount of charge is stored in the memory·computing device 14 as necessary.

<Judgment (Step S4)>

It is judged from the purpose of the imaging, the configuration of the imaging system, and previous imaging records whether imaging at a different frequency or imaging in a different phase is necessary or not. Examples of imaging records include records on frequencies and phases with which imaging was performed.

As described earlier, a plurality of imaging results in different phases may be obtained to extract information at a specific frequency. Use of a charge distribution imaging element makes it possible to obtain imaging results in a plurality of phases at one time, eliminating the need for switching phases. However, in the case where only an imaging result in one phase can be obtained in one imaging operation, judgment to switch phases may be made based on records.

To extract information on the resonant absorption of a desired molecule, it is necessary to perform imaging in a frequency range where the resonant absorption is strong and imaging in a frequency range where the resonant absorption is weak. In that case, a judgment to switch frequencies can be made based on the records of frequencies at which imaging was performed.

Alternatively, judgment may be made based on the imaging result. For example, by comparing an imaging result in a first phase and an imaging result in a second phase, it is possible to extract information at a specific frequency of light. Based on this extracted result, a judgment, for example, to perform imaging again at the same frequency or to change to another frequency may be made. For example, in the case where a distribution image of the desired molecule was obtained, the imaging may be finished. In the case where the imaging device 102 is, for example, a dedicated device for performing imaging of the distribution of a specific molecule, the imaging operation may be finished without judgment.

After the imaging operation is finished, if necessary, for example, an imaging result at a specific frequency of light may be calculated from a plurality of imaging results at the same frequency and in different phases, and the calculated imaging result may be stored in the memory·computing device 14 or may be displayed on a display device, or an instruction may be made to another control device, for example.

In some cases, an imaging result may be compared to information stored in a database, and computation may be performed to calculate what molecule is distributed, for example.

<Other Embodiments>

As shown in FIG. 7, in the case of obtaining information on the distribution of a molecule having resonant absorption in a specific frequency range, it is possible to eliminate or reduce the influence of the background resulting from the external environment or the like by measuring at a frequency where resonant absorption does not occur. For example, measurement to eliminate the influence of the background may be performed at a frequency at which the resonant absorption of the molecule is not considered to occur, such as f1(i+2) or f1(i+5). In this case, the modulation frequency of the sensitivity is changed to $\Delta(i+2)$ or $\Delta(i+5)$ (step S5), and exposure is performed again (step S3). By extracting the difference in the data obtained by two exposures, it is possible to obtain an image with less influence of the background.

In the case where measurement is necessary for the distribution of a molecule on which the local maximum frequency of resonant absorption A is unknown, an imaging operation may be repeated so as to scan a specified frequency range of the modulation frequency of the sensitivity of the imaging element 11. For example, as shown in FIG. 6, measurement may be performed by repeating steps S3 to S5 while changing the modulation frequency of the sensitivity of the imaging element 11 in the range from $\Delta(i)$ to $\Delta(i+5)$.

As for the mixing of the first light and the second light, the configuration may be such that either the first light beam or the second light beam is projected to the subject, and the first light or the second light obtained from the subject and the other of the first light and the second light that is not projected to the subject 51 are mixed.

As described above, in the imaging system and the imaging method of the present embodiment, since the frequencies and beat frequencies of a plurality of optical beats included in the third light are discrete, even if the frequency of the sensitivity modulation of the imaging device fluctuates, the fluctuations are unlikely to cause errors, and it is possible to obtain information on molecules composing an object and other information with good reproducibility.

The imaging system and the imaging method of the present disclosure can be used in various fields in which imaging is used to analyze subjects, for example, inspection of structures or industrial products, medical applications, and the like.

What is claimed is:

1. An imaging system comprising:
a first light source that emits first light having a spectrum including a plurality of discrete first frequency components arranged at first frequency intervals;
a second light source that emits second light having a spectrum including a plurality of discrete second frequency components arranged at second frequency intervals, the second frequency intervals being different from the first frequency intervals;
a mixing optical system that mixes the first light and the second light to generate third light including at least one optical beat, an intensity of the at least one optical beat changing at a beat frequency expressed by a difference between at least one of the discrete first frequency components and at least one of the discrete second frequency components;
an imaging element, a sensitivity of the imaging element being variable in an exposure period; and
a control circuit that changes the sensitivity of the imaging element at the beat frequency of the at least one optical beat.

2. The imaging system according to claim 1, wherein the mixing optical system is located at a position on an optical path between a subject and the first light source and on an optical path between the subject and the second light source.

3. The imaging system according to claim 1, wherein the second light is not reflected on the subject, and the mixing optical system mixes the second light and first reflected light obtained by the first light being reflected on the subject.

4. The imaging system according to claim 1, wherein the second light is not transmitted through the subject, and the mixing optical system mixes the second light and first transmitted light obtained by the first light being transmitted through the subject.

5. The imaging system according to claim 1, wherein each of the first light source and the second light source is a mode-locked laser.

6. The imaging system according to claim 1, wherein the sensitivity of the imaging element is variable by changing a quantum efficiency of the imaging element.

7. The imaging system according to claim 1, wherein the imaging element includes a storage region that stores a plurality of charges generated in the imaging element, and
the sensitivity of the imaging element is variable by changing a ratio of charges stored in the storage region out of the plurality of charges.

8. The imaging system according to claim 1, wherein the at least one optical beat includes a first optical beat and a second optical beat,
a frequency of the first optical beat is different from a frequency of the second optical beat, and
the beat frequency of the first optical beat is different from the beat frequency of the second optical beat.

9. An imaging method comprising:
mixing first light having a spectrum including a plurality of discrete first frequency components arranged at first frequency intervals and second light having a spectrum including a plurality of discrete second frequency components arranged at second frequency intervals, the second frequency intervals being different from the first frequency intervals, to obtain third light including at least one optical beat, an intensity of the at least one optical beat changing at a beat frequency expressed by a difference between at least one of the discrete first frequency components and at least one of the discrete second frequency components;
projecting the third light to a subject;
making the third light that has been transmitted through the subject or reflected on the subject and that has returned from the subject, incident on an imaging element; and
performing exposure while changing a sensitivity of the imaging element at the beat frequency of the at least one optical beat.

10. The imaging method according to claim 9, wherein the first light and the second light are generated by a mode-locked laser.

11. The imaging method according to claim 9, wherein the sensitivity of the imaging element is changed by changing a quantum efficiency of the imaging element.

12. The imaging method according to claim 9, wherein the imaging element includes a storage region that stores a plurality of charges generated in the imaging element, and
the sensitivity of the imaging element is changed by changing a ratio of charges stored in the storage region out of the plurality of charges.

13. The imaging method according to claim 9, wherein the at least one optical beat includes a first optical beat and a second optical beat,
a frequency of the first optical beat is different from a frequency of the second optical beat, and
the beat frequency of the first optical beat is different from the beat frequency of the second optical beat.

14. An imaging method comprising:
generating first light having a spectrum including a plurality of discrete first frequency components arranged at first frequency intervals and second light having a spectrum including a plurality of discrete second frequency components arranged at second frequency intervals, the second frequency intervals being different from the first frequency intervals;

projecting the first light to a subject;

mixing the first light that has been transmitted through the subject or reflected on the subject and that has returned from the subject and the second light that is not transmitted through or reflected on the subject to obtain third light including at least one optical beat, an intensity of the at least one optical beat changing at a beat frequency expressed by a difference between at least one of the discrete first frequency components and at least one of the discrete second frequency components;

making the third light incident on an imaging element; and performing exposure while changing a sensitivity of the imaging element at the beat frequency of the at least one optical beat.

15. The imaging method according to claim 14, wherein the first light and the second light are generated by a mode-locked laser.

16. The imaging method according to claim 14, wherein the sensitivity of the imaging element is changed by changing a quantum efficiency of the imaging element.

17. The imaging method according to claim 14, wherein the imaging element includes a storage region that stores a plurality of charges generated in the imaging element, and the sensitivity of the imaging element is changed by changing a ratio of charges stored in the storage region out of the plurality of charges.

18. The imaging method according to claim 14, wherein the at least one optical beat includes a first optical beat and a second optical beat, a frequency of the first optical beat is different from a frequency of the second optical beat, and the beat frequency of the first optical beat is different from the beat frequency of the second optical beat.

* * * * *